US 12,372,060 B2
United States Patent
Okumura

(10) Patent No.: US 12,372,060 B2
(45) Date of Patent: Jul. 29, 2025

(54) POWER GENERATION SYSTEM

(71) Applicant: Hisakazu Okumura, Kyoto (JP)

(72) Inventor: Hisakazu Okumura, Kyoto (JP)

(*) Notice: Subject to any disclaimer, the term of this patent is extended or adjusted under 35 U.S.C. 154(b) by 0 days.

(21) Appl. No.: 18/709,188

(22) PCT Filed: Sep. 22, 2022

(86) PCT No.: PCT/JP2022/035429
§ 371 (c)(1),
(2) Date: May 10, 2024

(87) PCT Pub. No.: WO2023/084931
PCT Pub. Date: May 19, 2023

(65) Prior Publication Data
US 2025/0003387 A1 Jan. 2, 2025

(30) Foreign Application Priority Data
Nov. 11, 2021 (JP) ................. 2021-184198

(51) Int. Cl.
F03D 15/10 (2016.01)
F03C 2/08 (2006.01)
(Continued)

(52) U.S. Cl.
CPC .................. *F03D 9/25* (2016.05); *F03C 2/08* (2013.01); *F03D 7/042* (2013.01); *F03D 15/10* (2016.05);
(Continued)

(58) Field of Classification Search
CPC ........ F03B 17/06; F03D 15/10; F03D 17/022; F03D 7/042; F03D 9/25; F05B 2210/16;
(Continued)

(56) References Cited

U.S. PATENT DOCUMENTS

| 10,355,558 B2 * | 7/2019 | Bao ......................... H02S 40/22 |
| 2013/0113215 A1 * | 5/2013 | Corcoran .............. F03B 13/188 290/54 |

(Continued)

FOREIGN PATENT DOCUMENTS

| CN | 210829610 U | 6/2020 |
| JP | 2018168799 A | 11/2018 |

OTHER PUBLICATIONS

International Search Report dated Nov. 22, 2022 for corresponding International Application No. PCT/JP2022/035429, 5 pages (with English translation).

*Primary Examiner* — Tulsidas C Patel
*Assistant Examiner* — S. Mikailoff
(74) *Attorney, Agent, or Firm* — MH2 Technology Law Group, LLP

(57) ABSTRACT

Provided is a power generation system capable of reducing an outer diameter of a wheel with which an arm mechanism is brought into contact after a rotational speed of a rotation body increases to a first value by applying a large torque to the rotation body until the rotational speed of the rotation body increases to the first value. A power generation system 1 of the present invention is a power generation system in which a cam member 7 is rotated by hydroelectric power or wind power to bring a cam 6 into contact with an arm mechanism 3 and to rotate the arm mechanism 3, and the arm mechanism 3 comes into contact with either of wheels 42 and 41 of a rotation body 44 during the rotation of the arm mechanism 3 to rotate the rotation body 44. The power generation system 1 includes operation control means for transitioning to an operation in a second mode in which the arm mechanism 3 is brought into contact with a small-diameter wheel 41 in response to an increase in a rotational speed of the rotation body 44 to a first value during an operation in the first mode in which the arm mechanism 3 is (Continued)

brought into contact with the large-diameter wheel 42, and transitioning to the operation in the first mode in response to a decrease in the rotational speed of the rotation body 44 to a second value during the operation in the second mode.

7 Claims, 16 Drawing Sheets

(51) Int. Cl.
  *F03D 7/04* (2006.01)
  *F03D 9/25* (2016.01)
  *F03D 17/00* (2016.01)
(52) U.S. Cl.
  CPC ...... *F03D 17/022* (2023.08); *F05B 2270/821* (2013.01)
(58) Field of Classification Search
  CPC .......... F05B 2260/403; F05B 2260/506; F05B 2270/821; H02K 7/1807; F03C 2/08
  USPC .................................................. 290/1 R, 54
  See application file for complete search history.

(56) References Cited

U.S. PATENT DOCUMENTS

| | | | |
|---|---|---|---|
| 2019/0140517 A1* | 5/2019 | Bao | H10N 10/13 |
| 2021/0123419 A1* | 4/2021 | Okumura | F03D 1/04 |
| 2025/0003387 A1* | 1/2025 | Okumura | F03D 17/022 |
| 2025/0084817 A1* | 3/2025 | Hill | F03B 17/067 |

* cited by examiner (A)

(B)

(A)

(B)

(A)

(B)

(A)

(B)

(C)

(A)

(B)

(A)

(B)

POWER GENERATION SYSTEM

CROSS-REFERENCE TO RELATED APPLICATIONS

This application is a U.S. national stage application of PCT/JP2022/035429 filed 22 Sep. 2022, which claims the benefit of, and relies on the filing date of, Japanese Patent Application No. 2021-184198 filed 11 Nov. 2021, the entire disclosure of which is incorporated herein by reference.

TECHNICAL FIELD

The present invention relates to a power generation system capable of generating power using natural energy such as hydroelectric power and wind power.

BACKGROUND ART

In recent years, environmental awareness has increased against the background of global warming, and thus power generation using natural energy such as hydroelectric power and wind power has been demanded. However, in our country having a small land area, it is difficult to newly construct large-scale hydroelectric power generation facilities and wind power generation facilities. Therefore, the applicant of the present application has invented the power generation system disclosed in PTL 1, which is capable of generating power using natural energy such as hydroelectric power and wind power by being installed in a river, a water channel, a coast, a windy place, or the like. In this power generation system, a cam of a cam wheel comes into contact with an arm mechanism due to rotation of the cam wheel caused by hydroelectric power or wind power, and thus the arm mechanism is rotated. When the arm mechanism comes into contact with a drive wheel of a rotation body during the rotation of the arm mechanism, the rotation body is rotated, and rotational energy of the rotation body is converted into electric energy to generate power.

CITATION LIST

Patent Literature

PTL 1: JP2018-168799A

SUMMARY OF INVENTION

Technical Problem

However, in the power generation system in PTL 1, by bringing the arm mechanism into contact with a single wheel, the torque applied to the rotation body and the diameter of the wheel with which the arm mechanism is brought into contact cannot be changed according to a rotational speed of the rotation body, and there is room for improvement in this respect.

The present invention has been made in view of the above circumstances, and an object of the present invention is to provide a power generation system in which a cam member is rotated by hydroelectric power or wind power, a cam of the cam member comes into contact with an arm mechanism to rotate the arm mechanism, and the arm mechanism comes into contact with a wheel of a rotation body during rotation of the arm mechanism to rotate the rotation body, and rotational energy of the rotation body is converted into electric energy such that power is generated, in which a large torque is applied to the rotation body until a rotational speed of the rotation body increases to a first value, and after the rotational speed of the rotation body increases to the first value, an outer diameter of the wheel with which the arm mechanism comes into contact can be reduced to maintain or further increase the rotational speed of the rotation body.

Solution to Problem

In order to achieve the above object, the present invention includes the subject matter as set forth in the following items.

Item 1. A power generation system including:
  a cam device including a cam member of which a cam protrudes from an outer circumferential surface, the cam member being rotated by hydroelectric power or wind power;
  a generator including a rotation body in which an arm mechanism that is rotated when the cam comes into contact with the rotation body during rotation of the cam member, a small-diameter wheel, and a large-diameter wheel having an outer diameter larger than that of the small-diameter wheel are attached to a rotation shaft, in which the arm mechanism comes into contact with an outer circumferential surface of either the small-diameter wheel or the large-diameter wheel during rotation of the arm mechanism, and thus the rotation body is rotated, and power is generated by converting rotational energy of the rotation body into electric energy; and
  operation control means for transitioning to an operation in a second mode of bringing the arm mechanism into contact with the small-diameter wheel in response to an increase in a rotational speed of the rotation body to a first value while the operation control means is operated in a first mode of bringing the arm mechanism into contact with the large-diameter wheel, and transitioning to an operation in the first mode in response to a decrease in a rotational speed of the rotation body to a second value equal to or smaller than the first value while the operation control means is operated in the second mode.

Item 2. The power generation system according to Item 1, in which
  the arm mechanism includes a cam arm, a large-diameter wheel arm, a small-diameter wheel arm, a main shaft, and biasing means,
  the main shaft penetrates through a basal end portion of the cam arm, a basal end portion of the small-diameter wheel arm, and a basal end portion of the large-diameter wheel arm,
  the cam arm is rotated about the main shaft in a first direction due to pressing of the cam each time the cam comes into contact with a distal end portion of the cam arm due to rotation of the cam member,
  the biasing means biases the cam arm in a second direction opposite to the first direction each time the cam arm is rotated in the first direction, and the cam arm is rotated in the first direction due to the biasing of the biasing means, and is then reversed and rotated in the second direction,
  the operation control means,
  as an operation in the first mode,
  rotates only the large-diameter wheel arm out of the large-diameter wheel arm and the small-diameter wheel arm together with the cam arm in the first direction, then reverses and rotates the large-diameter wheel arm in the second direction, does not bring the large-diameter wheel arm into contact with the large-diameter wheel by retracting the large-diameter wheel arm while the large-diameter wheel arm is being rotated in the first direction, and brings the large-diameter wheel arm into contact with the large-diameter wheel by stretching the large-diameter wheel arm while the large-diameter wheel arm is being rotated in the second direction, and the operation control means, as an operation in the second mode, rotates only the small-diameter wheel arm out of the large-diameter wheel arm and the small-diameter wheel arm together with the cam arm in the first direction, then reverses and rotates the small-diameter wheel arm in the second direction, does not bring the small-diameter wheel arm into contact with the small-diameter wheel by retracting the small-diameter wheel arm while the small-diameter wheel arm is being rotated in the first direction, and brings the small-diameter wheel arm into contact with the small-diameter wheel by stretching the small-diameter wheel arm while the small-diameter wheel arm is being rotated in the second direction.

Item 3. The power generation system according to Item 2, in which the cam arm includes a main shaft penetration member and a cam arm body, and a basal end portion of the cam arm is configured by the main shaft penetration member, the main shaft penetration member includes an upper plate, a lower plate disposed below the upper plate with a gap therebetween, and a coupling plate extending in a vertical direction and coupling an intermediate portion of the upper plate and an intermediate portion of the lower plate, the cam arm body extends from the coupling plate to the cam device side, the basal end portion of the small-diameter wheel arm and the basal end portion of the large-diameter wheel arm are disposed in a space between the upper plate and the lower plate, the space being closer to the generator than the coupling plate is, the biasing means includes a base plate, a coil spring disposed on the base plate, an annular plate supported by an upper end portion of the coil spring, and a roller rotatably attached to an upper surface of the annular plate, and the base plate, the coil spring, the annular plate, and the roller are disposed below the lower plate, the main shaft extends upward from the base plate, sequentially passes through an inside of the coil spring and an inside of the annular plate, and then sequentially passes through the lower plate, the basal end portion of the large-diameter wheel arm, a spacer fixed to the main shaft, the basal end portion of the small-diameter wheel arm, and the upper plate, or sequentially passes through the inside of the coil spring and the inside of the annular plate, and then sequentially passes through the lower plate, the basal end portion of the small-diameter wheel arm, the spacer fixed to the main shaft, the basal end portion of the large-diameter wheel arm, and the upper plate, a protrusion having a tapered surface is provided on a lower surface of the lower plate, and the tapered surface is inclined in the second direction toward a lower side, and while the cam arm is being rotated in the first direction, the tapered surface presses the roller due to rotation of the protrusion in the first direction, so that the roller rolls from an upper side to a lower side of the tapered surface, a downward force is applied from the annular plate to the coil spring, and the coil spring is compressed, then, an upward force is applied from the coil spring to the annular plate due to elastic return of the coil spring, and the roller presses the tapered surface to bias the cam arm in the second direction, so that the cam arm is reversed from the first direction to be rotated in the second direction, and thus, the roller rolls from the lower side to the upper side of the tapered surface.

Item 4. The power generation system according to Item 3, in which the operation control means includes a first stepping motor having a first motor shaft, a first cam, a second cam, a first stopper, a second stopper, a first stopper spring, a second stopper spring, a rotation sensor, and a control device, the first cam and the second cam are attached to the first motor shaft with a gap therebetween, and the first stepping motor is supported by the upper plate or the lower plate such that the first motor shaft extends in the vertical direction in a space closer to the cam device than the coupling plate between the upper plate and the lower plate, the first cam faces the basal end portion of the large-diameter wheel arm, and the second cam faces the basal end portion of the small-diameter wheel arm, the first stopper passes through a first through-hole of the coupling plate to be movable between the basal end portion of the large-diameter wheel arm and the first cam, the first stopper spring is a coil spring through which the first stopper passes, and is sandwiched between a first flange portion protruding from an outer periphery of the first stopper and the coupling plate, the second stopper passes through a second through-hole of the coupling plate to be movable between the basal end portion of the small-diameter wheel arm and the second cam, the second stopper spring is a coil spring through which the second stopper passes, and is sandwiched between a second flange portion protruding from an outer periphery of the second stopper and the coupling plate, a first recess for fitting one end portion of the first stopper is provided in the basal end portion of the large-diameter wheel arm, a second recess for fitting one end portion of the second stopper is provided in the basal end portion of the small-diameter wheel arm, when the first motor shaft of the first stepping motor is rotated forward, the first cam presses the first stopper toward the large-diameter wheel arm, the first stopper spring is compressed, one end portion of the first stopper is fitted into the first recess, and pressing of the second stopper from the second cam is released, the second stopper spring is elastically returned, and the one end portion of the second stopper is detached from the second recess, when the first motor shaft of the first stepping motor is rotated backward, pressing of the first stopper from the first cam is released, the first stopper spring is elastically returned, one end portion of the first stopper is detached from the first recess, and the second cam presses the second stopper against the small-diameter wheel arm, the second stopper spring is compressed, and the one end portion of the second stopper is fitted into the second recess, the rotation sensor is capable of detecting a rotational speed of the rotation body, in response to a predetermined operation performed on an input unit of the control device, the control device rotates the first motor shaft of the first stepping motor forward, so that the one end portion of the second stopper is detached from the second recess, and the large-diameter wheel arm is rotated together with the cam arm in the first direction, and is then reversed and rotated in the second direction, the control device rotates the first motor shaft of the first stepping motor backward in response to the rotation sensor detecting that the rotational speed of the rotation body has increased to the first value, so that the one end portion of the second stopper is fitted into the second recess, and the small-diameter wheel arm is rotated together with the cam arm in the first direction, and is then reversed and rotated in the second direction, and the control device rotates the first motor shaft of the first stepping motor forward in response to the rotation sensor detecting that the rotational speed of the rotation body has decreased to the second value, so that the one end portion of the second stopper is detached from the second recess, and the large-diameter wheel arm is rotated together with the cam arm in the first direction, and is then reversed and rotated in the second direction.

Item 5. The power generation system according to Item 3 or 4, in which the large-diameter wheel arm includes a first support member and a first movable body, a basal end portion of the first support member configures the basal end portion of the large-diameter wheel arm, the first movable body includes a first joint body, a second joint body, a first rod, and a first elastic member, a distal end portion of the first joint body and a basal end portion of the second joint body are hinge-coupled, a distal end portion of the second joint body and a basal end portion of the first rod are hinge-coupled, the first rod is movably supported by the first support member, and the first elastic member extends from a distal end portion of the first rod and configures the distal end portion of the large-diameter wheel arm, the small-diameter wheel arm includes a second support member and a second movable body, a basal end portion of the second support member configures the basal end portion of the small-diameter wheel arm, the second movable body includes a third joint body, a fourth joint body, a second rod, and a second elastic member, a distal end portion of the third joint body and a basal end portion of the fourth joint body are hinge-coupled, a distal end portion of the fourth joint body and a basal end portion of the second rod are hinge-coupled, the second rod is movably supported by the second support member, and the second elastic member extends from a distal end portion of the second rod and configures the distal end portion of the small-diameter wheel arm, the operation control means further includes a second stepping motor having a second motor shaft, a third stepping motor having a third motor shaft, and a position sensor, the second stepping motor is supported by the first support member, and the second motor shaft is connected to a basal end portion of the first joint body, the third stepping motor is supported by the second support member, and the third motor shaft is connected to a basal end portion of the third joint body, the position sensor is capable of detecting that the cam arm has reached a rotation start position in the first direction or a rotation start position in the second direction, a state in which the operation control means stretches the large-diameter wheel arm while the large-diameter wheel arm is being rotated in the second direction is realized by the control device rotating the second motor shaft of the second stepping motor forward in response to the position sensor detecting that the cam arm has reached the rotation start position in the second direction, so that the first joint body and the second joint body become linear and the first rod and the first elastic member are moved toward the generator due to pressing of the second joint body, and the first elastic member comes into contact with the large-diameter wheel while the large-diameter wheel arm is being rotated in the second direction, a state in which the operation control means retracts the large-diameter wheel arm while the large-diameter wheel arm is being rotated in the first direction is realized by the control device rotating the second motor shaft of the second stepping motor backward in response to the position sensor detecting that the cam arm has reached the rotation start position in the first direction, so that the first joint body and the second joint body are bent and the first rod and the first elastic member are moved toward the cam member due to traction of the second joint body, and the first elastic member does not come into contact with the large-diameter wheel while the large-diameter wheel arm is being rotated in the first direction, a state in which the operation control means stretches the small-diameter wheel arm while the small-diameter wheel arm is being rotated in the second direction is realized by control device rotating the third motor shaft of the third stepping motor forward in response to the position sensor detecting that the cam arm has reached the rotation start position in the second direction, so that the third joint body and the fourth joint body become linear and the second rod and the second elastic member are moved toward the generator due to pressing of the fourth joint body, and the second elastic member comes into contact with the small-diameter wheel while the small-diameter wheel arm is being rotated in the second direction, and a state in which the operation control means retracts the small-diameter wheel arm while the small-diameter wheel arm is being rotated in the first direction is realized by the control device rotating the third motor shaft of the third stepping motor backward in response to the position sensor detecting that the cam arm has reached the rotation start position in the first direction, so that the third joint body and the fourth joint body are bent and the second rod and the second elastic member are moved toward the cam member due to traction of the fourth joint body, and the second elastic member does not come into contact with the small-diameter wheel while the small-diameter wheel arm is being rotated in the first direction.

Item 6. The power generation system according to Item 3 or 4, in which
    the large-diameter wheel arm includes a first support member and a first movable body,
    a basal end portion of the first support member configures the basal end portion of the large-diameter wheel arm,
    the first movable body includes a first joint body, a second joint body, a first absorber, a first rod, and a first elastic member, and the first rod is movably supported by the first support member,
    the first absorber includes a first cylinder having an opening at a distal end thereof, and a first spring disposed inside the first cylinder, a distal end portion of the first joint body and a basal end portion of the second joint body are hinge-coupled, a distal end portion of the second joint body and a basal end portion of the first cylinder are hinge-coupled, a basal end portion of the first spring and a basal end portion of the first cylinder are connected, a distal end portion of the first spring and a basal end portion of the first rod are connected, and the first elastic member extends from the distal end portion of the first rod and configures the distal end portion of the large-diameter wheel arm,
    the small-diameter wheel arm includes a second support member and a second movable body,
    a basal end portion of the second support member configures the basal end portion of the small-diameter wheel arm,
    the second movable body includes a third joint body, a fourth joint body, a second absorber, a second rod, and a second elastic member, and the second rod is movably supported by the second support member,
    the second absorber includes a second cylinder having an opening at a distal end thereof, and a second spring disposed inside the second cylinder, a distal end portion of the third joint body and a basal end portion of the fourth joint body are hinge-coupled, a distal end portion of the fourth joint body and a basal end portion of the second cylinder are hinge-coupled, a distal end portion of the second spring and a basal end portion of the second rod are connected, and the second elastic member extends from a distal end portion of the second rod and configures the distal end portion of the small-diameter wheel arm,
    the operation control means further includes a second stepping motor having a second motor shaft, a third stepping motor having a third motor shaft, and a position sensor,
    the second stepping motor is supported by the first support member, and the second motor shaft is connected to a basal end portion of the first joint body,
    the third stepping motor is supported by the second support member, and the third motor shaft is connected to a basal end portion of the third joint body,
    the position sensor is capable of detecting that the cam arm has reached the rotation start position in the first direction or the rotation start position in the second direction,
    a state in which the operation control means stretches the large-diameter wheel arm while the large-diameter wheel arm is being rotated in the second direction is realized by the control device rotating the second motor shaft of the second stepping motor forward in response to the position sensor detecting that the cam arm has reached the rotation start position in the second direction, so that the first joint body and the second joint body become linear and the first cylinder, the first spring, the first rod, and the first elastic member are moved toward the generator, and the first elastic member comes into contact with the large-diameter wheel while the large-diameter wheel arm is being rotated in the second direction,
    a state in which the operation control means retracts the large-diameter wheel arm while the large-diameter wheel arm is being rotated in the first direction is realized by the control device rotating the second motor shaft of the second stepping motor backward in response to the position sensor detecting that the cam arm has reached the rotation start position in the first direction, so that the first joint body and the second joint body are bent and the first cylinder, the first spring, the first rod, and the first elastic member are moved toward the cam wheel, and the first elastic member does not come into contact with the large-diameter wheel while the large-diameter wheel arm is being rotated in the first direction,
    a state in which the operation control means stretches the small-diameter wheel arm while the small-diameter wheel arm is being rotated in the second direction is realized by the control device rotating the third motor shaft of the third stepping motor forward in response to the position sensor detecting that the cam arm has reached the rotation start position in the second direction, so that the third joint body and the fourth joint body become linear and the second cylinder, the second spring, the second rod, and the second elastic member are moved toward the generator, and the second elastic member comes into contact with the small-diameter wheel while the small-diameter wheel arm is being rotated in the second direction, and a state in which the operation control means retracts the small-diameter wheel arm while the small-diameter wheel arm is being rotated in the first direction is realized by the control device rotating the third motor shaft of the third stepping motor backward in response to the position sensor detecting that the cam arm has reached the rotation start position in the first direction, so that the third joint body and the fourth joint body are bent and the second cylinder, the second spring, the second rod, and the second elastic member are moved toward the cam member, and the second elastic member does not come into contact with the small-diameter wheel while the small-diameter wheel arm is being rotated in the first direction.

Advantageous Effects of Invention

According to the power generation system of the present invention, a transition to the operation in the second mode in which the small-diameter wheel is brought into contact with the arm mechanism occurs in response to the increase in the rotational speed of the rotation body to the first value, and a transition to the operation in the first mode occurs in response to the decrease in the rotational speed of the rotation body to the second value equal to or smaller than the first value during the operation in the second mode. As a result, until the rotational speed of the rotation body increases to the first value, a large torque is applied to the rotation body, and after the rotational speed of the rotation body increases to the first value, the outer diameter of the drive wheel with which the arm mechanism is brought into contact can be reduced in order to maintain or further increase the rotational speed of the rotation body.

DESCRIPTION OF EMBODIMENTS

Figure 1:
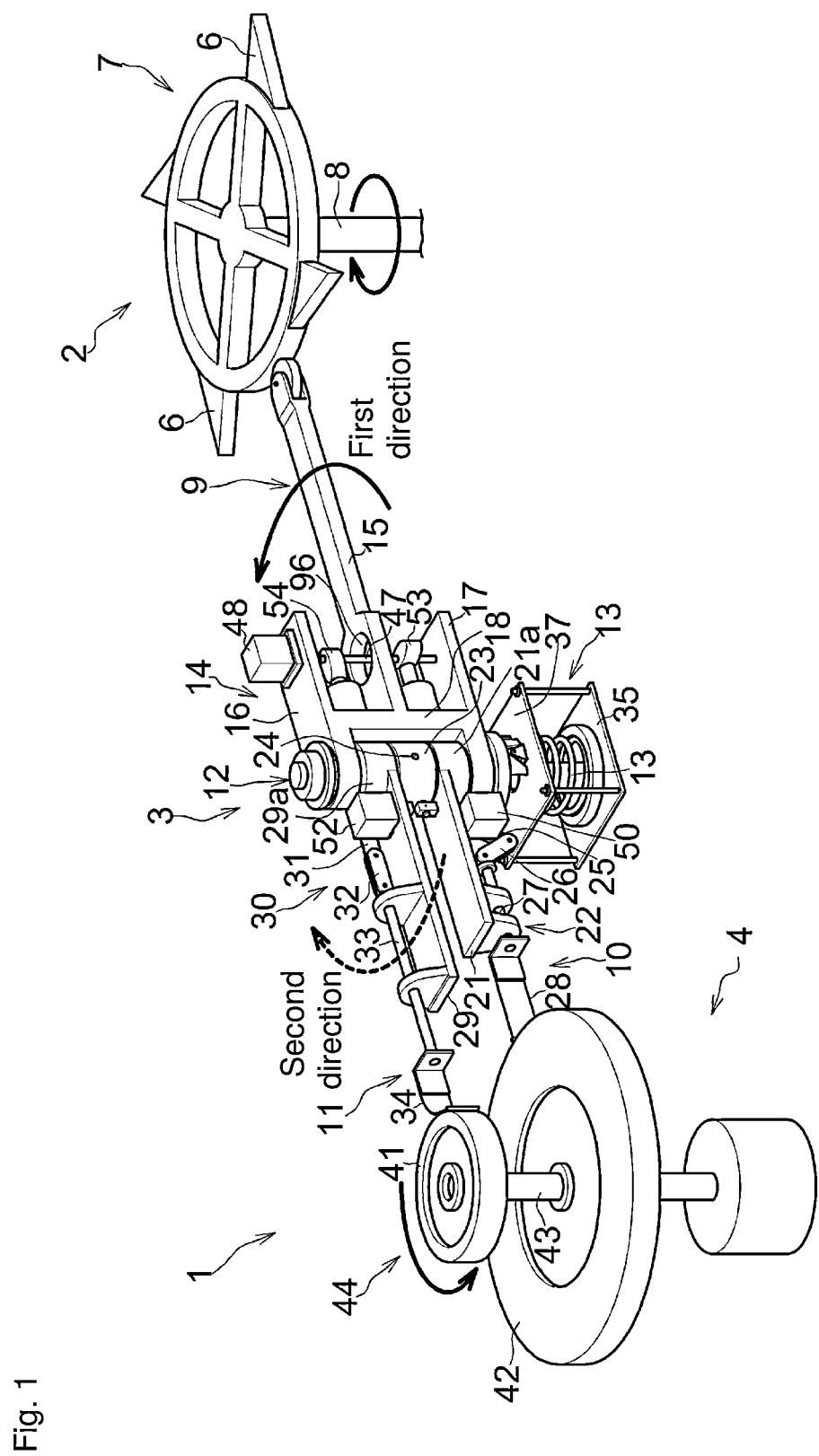
FIG. 1 is a perspective view illustrating a power generation system according to an embodiment of the present invention.
Figure 2:
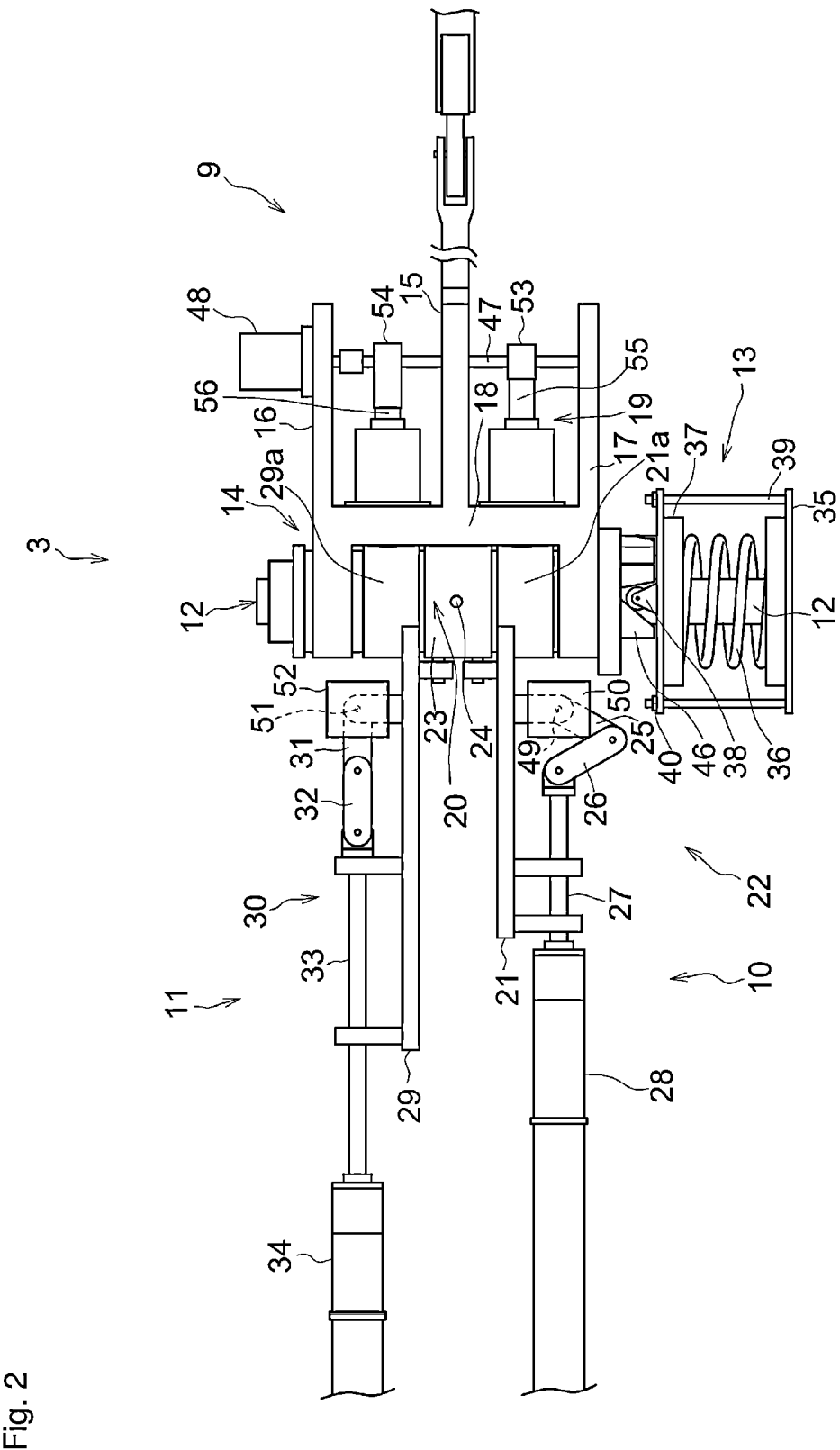
FIG. 2 is a side view illustrating an arm mechanism included in the power generation system according to the embodiment of the present invention.
Figure 3:
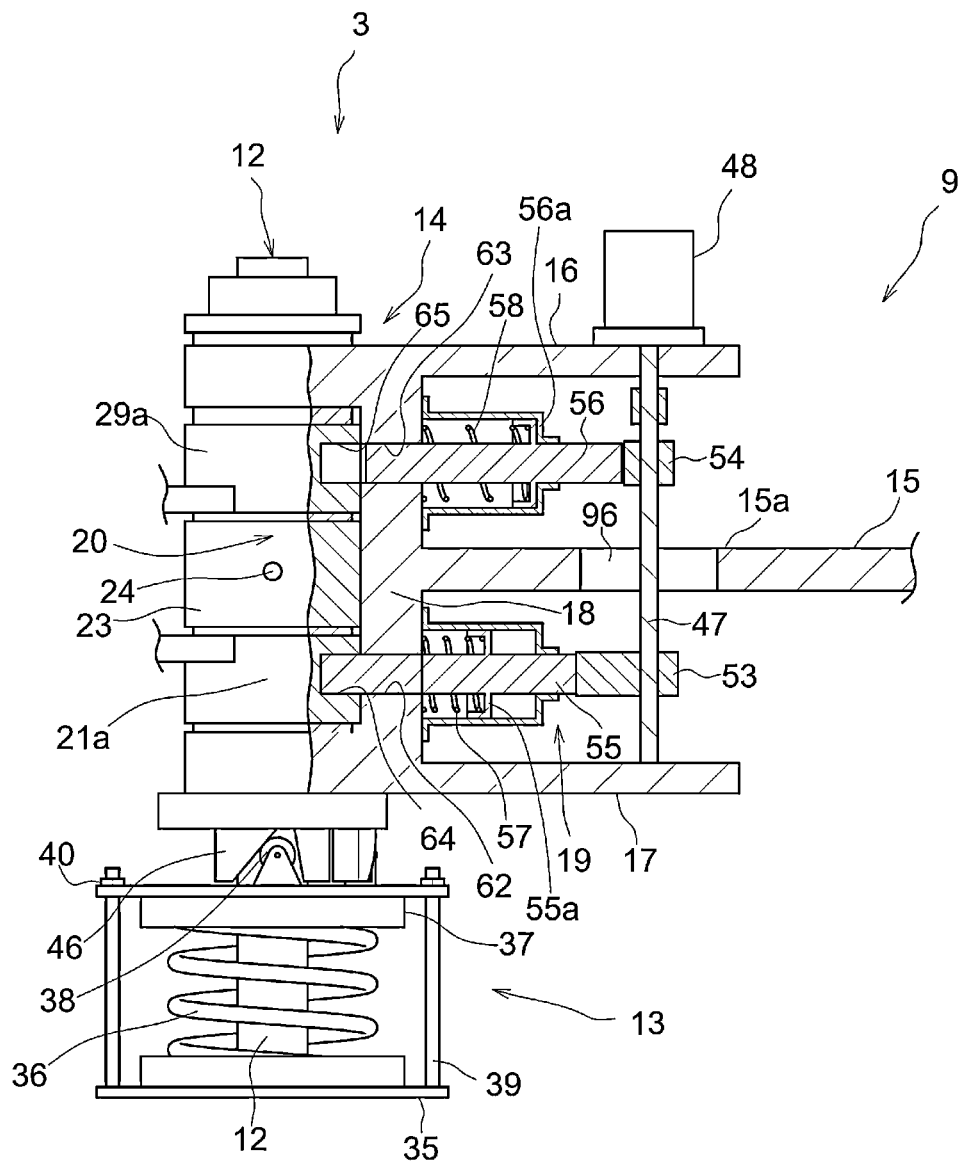
FIG. 3 is a side view illustrating a part of the arm mechanism.
Figure 4:
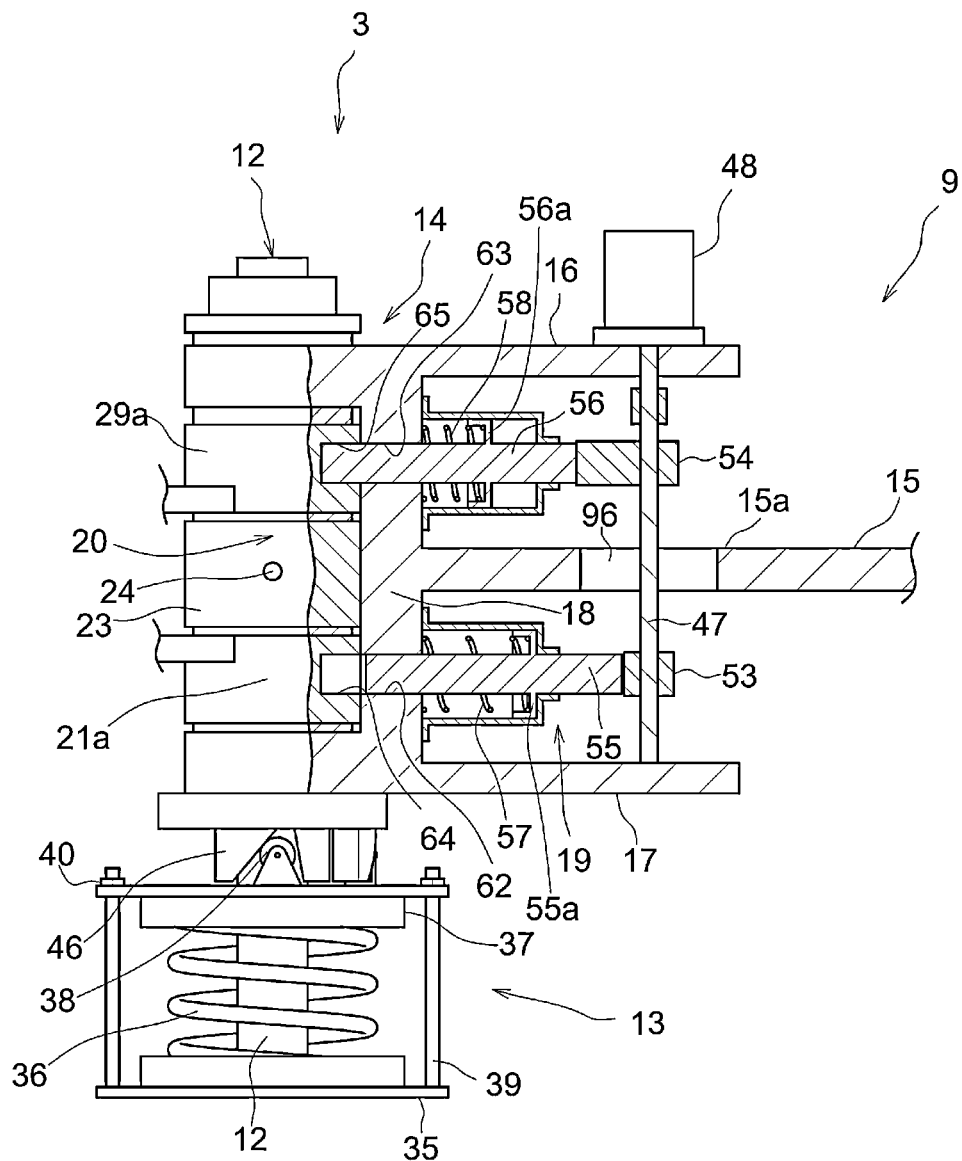
FIG. 4 is a side view illustrating a part of the arm mechanism.

Hereinafter, embodiments of the present invention will be described with reference to the accompanying drawings. FIG. 1 is a perspective view illustrating a power generation system 1 according to an embodiment of the present invention. FIG. 2 is a side view illustrating an arm mechanism 3 included in the power generation system 1 according to the embodiment of the present invention. FIGS. 3 and 4 are side views illustrating a part of the arm mechanism 3 (hatched ranges in FIGS. 3 and 4 are cross-sectional views). FIGS. 5(A) and 5(B) are side views illustrating a large-diameter wheel arm 10 included in the power generation system 1. FIGS. 6(A) and 6(B) are side views illustrating a small-diameter wheel arm 11 included in the power generation system 1. FIGS. 7(A) and 7(B) are side views illustrating biasing means 13 included in the power generation system 1.

The power generation system 1 according to the present embodiment can generate power by being installed in a river, a water channel, a coast, a windy place, or the like. The power generation system 1 includes a cam device 2, an arm mechanism 3, a generator 4, and operation control means.

The cam device 2 includes a cam member 7 in which a cam 6 protrudes from an outer circumferential surface, and the cam member 7 is rotated by hydroelectric power or wind power. In the illustrated example, the cam member 7 is configured with the cam wheel in which the cam 6 protrudes from the outer circumferential surface, but the present invention does not limit the cam member 7 to being configured with the cam wheel, and the cam member 7 may be, for example, a member in which the cam 6 protrudes from the outer circumferential surface of a thin cylindrical body. In the illustrated example, four cams 6 are provided on the outer circumferential surface of the cam member 7, but the number of cams 6 provided on the outer circumferential surface of the cam member 7 may be one or any plural number. In a case where a plurality of cams 6 are provided on the outer circumferential surface of the cam member 7, it is preferable that the intervals between two cams 6 adjacent to each other in the circumferential direction of the cam member 7 are the same (FIG. 1 illustrates an example in which four cams 6 are provided at equal intervals in the circumferential direction of the cam member 7).

Means for rotating the cam member 7 with hydroelectric power or wind power is not particularly limited, but for example, a turbine, a transmission, a belt mechanism, and a coupling disclosed in PTL 1 (JP2018-168799A) may be used. In this case, the cam device 2 includes a cam member 7, a main drive shaft 8, and a clutch mechanism (not illustrated).

In the turbine, a plurality of blades are attached in a circumferential direction of a rotation shaft. The rotation shaft is rotated around the shaft by applying hydroelectric power or wind power to these blades. The transmission includes an input shaft that is rotated when torque of a rotation shaft is transmitted, an output shaft that is rotated when torque of the input shaft is transmitted, an input rotational speed sensor that measures an input rotational speed that is a rotational speed per unit time of the input shaft, an output rotational speed sensor that measures an output rotational speed that is a rotational speed per unit time of the output shaft, and control means for controlling a transmission ratio that is a ratio of the input rotational speed and the output rotational speed so that the output rotational speed is constant. The belt mechanism couples a rotation shaft of a turbine and an input shaft of a transmission, and the torque of the rotation shaft is transmitted to the input shaft of the transmission via the belt mechanism, and thus the input shaft of the transmission is rotated. The coupling couples the output shaft of the transmission and the main drive shaft 8 of the cam device 2. The torque of the output shaft of the transmission is transmitted to the main drive shaft 8 via the coupling, and thus the main drive shaft 8 is rotated. Note that the output shaft of the transmission and the main drive shaft 8 may be coupled via known means other than the coupling to transmit the torque of the output shaft of the transmission to the main drive shaft 8 (for example, when a belt wound around the output shaft of the transmission and the main drive shaft 8 is provided, the torque of the output shaft of the transmission can be transmitted to the main drive shaft 8 via the belt). The clutch mechanism of the cam device 2 can switch between connection and disconnection between the main drive shaft 8 and the cam member 7. In a state in which the main drive shaft 8 and the cam member 7 are connected to each other, torque of the main drive shaft 8 is transmitted to the cam member 7, and thus the cam member 7 is rotated.

The arm mechanism 3 is disposed between the cam device 2 and the generator 4, and is rotated when the cam 6 comes into contact with the arm mechanism 3 during rotation of the cam member 7.

The arm mechanism 3 includes a cam arm 9, a large-diameter wheel arm 10, a small-diameter wheel arm 11, a main shaft 12, and biasing means 13. Hereinafter, out of both end portions of the member included in the power generation system 1, an end portion close to the main shaft 12 will be referred to as a "basal end portion", and an end portion far from the main shaft 12 will be referred to as a "distal end portion".

The cam arm 9 includes a main shaft penetration member 14 configuring a basal end portion thereof and a cam arm body 15 extending from the main shaft penetration member 14.

The main shaft penetration member 14 (corresponding to the basal end portion of the cam arm 9) includes an upper plate 16, a lower plate 17 disposed below the upper plate 16 with a gap therebetween, and a coupling plate 18 extending in the vertical direction and coupling an intermediate portion of the upper plate 16 and an intermediate portion of the lower plate 17. Hereinafter, a space between the upper plate 16 and the lower plate 17 closer to the cam device 2 than the coupling plate 18 will be referred to as a space 19 (FIG. 2), and a space between the upper plate 16 and the lower plate 17 closer to the generator 4 than the coupling plate 18 will be referred to as a space 20 (FIG. 20).

A basal end portion 21a of the large-diameter wheel arm 10 and a basal end portion 29a of the small-diameter wheel arm 11 are disposed in the space 20. As a result, the upper plate 16 is located above the basal end portion 21a of the large-diameter wheel arm 10 and the basal end portion 29a of the small-diameter wheel arm 11, and the lower plate 17 is located below the basal end portion 21a of the large-diameter wheel arm 10 and the basal end portion 29a of the small-diameter wheel arm 11.

The cam arm body 15 extends from the coupling plate 18 toward the cam device 2. A through-hole 96 (FIGS. 1, 3, and 4) is provided in a basal end portion 15a of the cam arm body 15 located in the space 19, and a first motor shaft 47 of a first stepping motor 48 that will be described later passes through the through-hole 96.

The large-diameter wheel arm 10 includes a first support member 21 and a first movable body 22.

The basal end portion 21a of the first support member 21 configures a basal end portion of the large-diameter wheel arm 10. In the present embodiment, a spacer 23 fixed to the main shaft 12 by using a fixation pin 24 is disposed in the space 20, and the basal end portion 21a of the first support member 21 is disposed between the spacer 23 and the lower plate 17.

Figure 5:
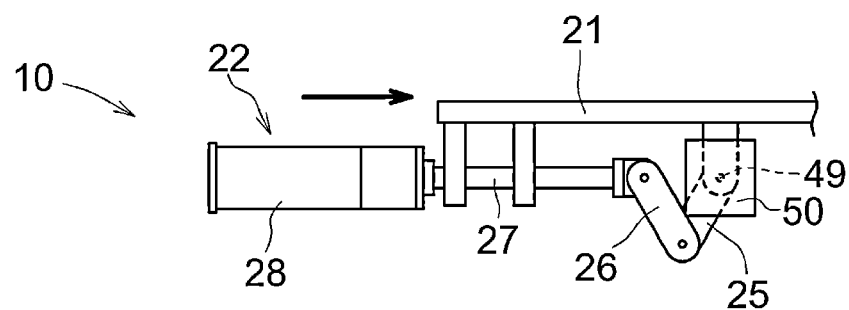
FIGS. 5(A) and 5(B) are side views illustrating a large-diameter wheel arm included in the power generation system.
Figure 5:
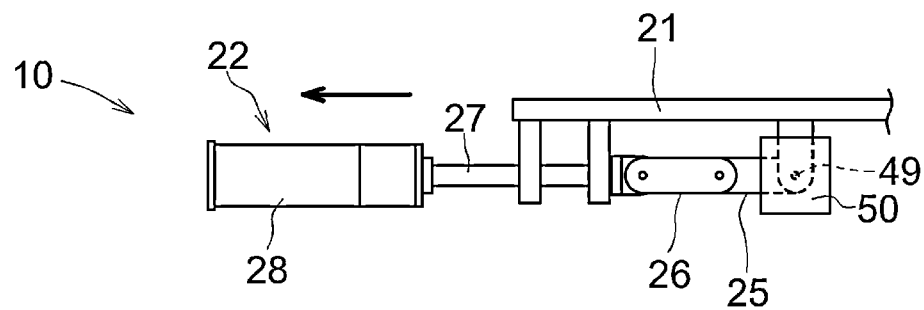

As illustrated in FIGS. 2 and 5, the first movable body 22 includes a first joint body 25, a second joint body 26, a first rod 27, and a first elastic member 28. In the first movable body 22, a distal end portion of the first joint body 25 and a basal end portion of the second joint body 26 are hinge-coupled, a distal end portion of the second joint body 26 and a basal end portion of the first rod 27 are hinge-coupled, and the first rod 27 is movably supported by the first support member 21. The first elastic member 28 extends from the distal end portion of the first rod 27 and configures the distal end portion of the large-diameter wheel arm 10.

The small-diameter wheel arm 11 includes a second support member 29 and a second movable body 30.

A basal end portion 29a of the second support member 29 configures the basal end portion of the small-diameter wheel arm 11, and is disposed between the spacer 23 and the upper plate 16.

Figure 6:
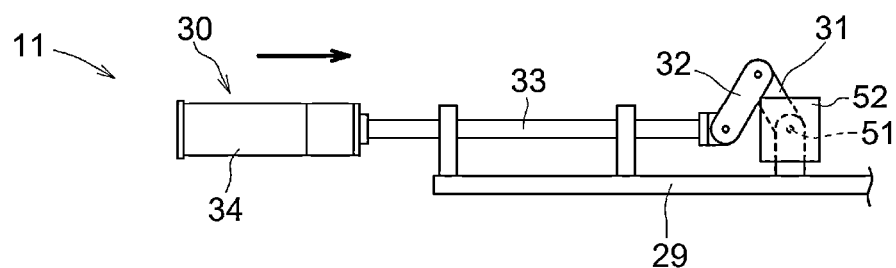
FIGS. 6(A) and 6(B) are side views illustrating a small-diameter wheel arm included in the power generation system.
Figure 6:
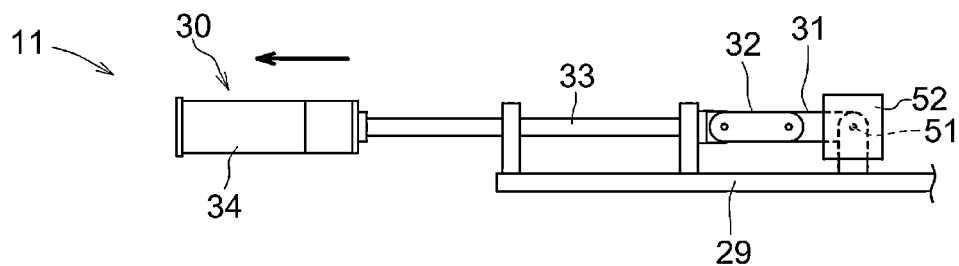
Figure 7:
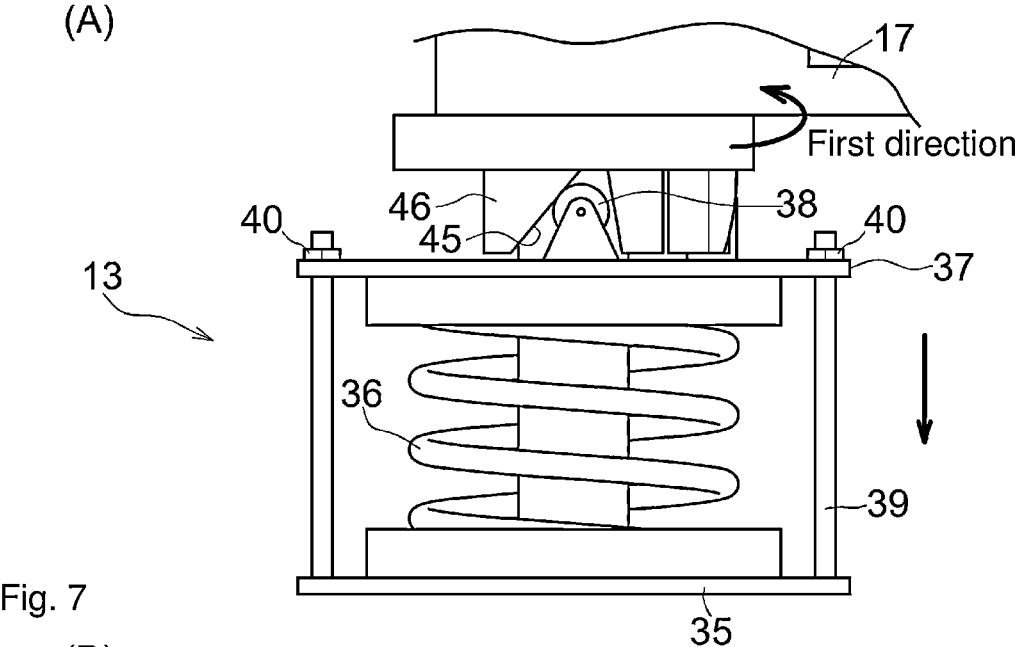
FIGS. 7(A) and 7(B) are side views illustrating biasing means included in the power generation system.
Figure 7:
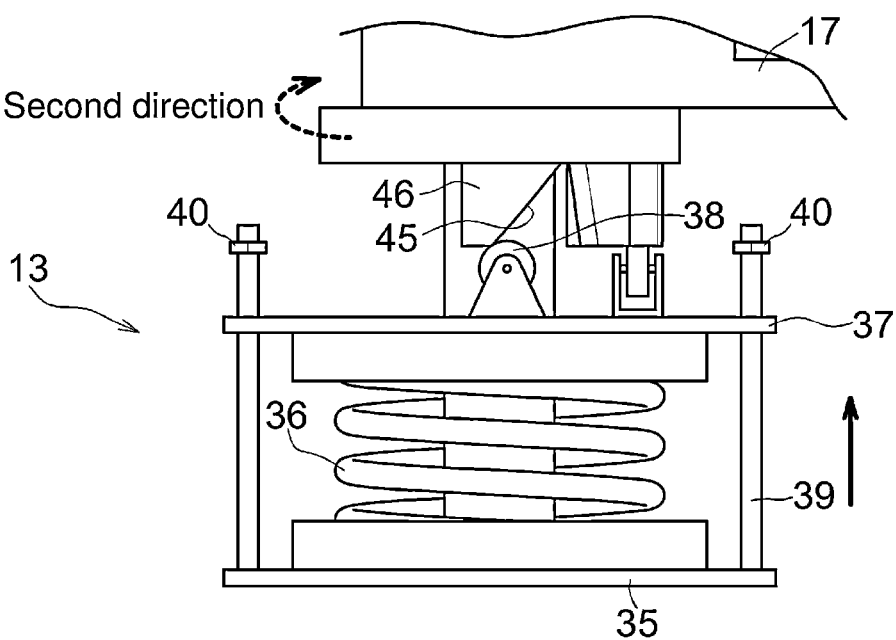

As illustrated in FIGS. 2 and 6, the second movable body 30 includes a third joint body 31, a fourth joint body 32, a second rod 33, and a second elastic member 34. In the second movable body 30, a distal end portion of the third joint body 31 and a basal end portion of the fourth joint body 32 are hinge-coupled, a distal end portion of the fourth joint body 32 and a basal end portion of the second rod 33 are hinge-coupled, and the second rod 33 is movably supported by the second support member 29. The second elastic member 34 extends from the distal end portion of the second rod 33 and configures the distal end portion of the small-diameter wheel arm 11.

The biasing means 13 biases the cam arm 9 in a second direction opposite to a first direction each time the cam arm 9 is rotated in the first direction. Due to the biasing of the biasing means 13, the cam arm 9 is rotated in the first direction, then reversed, and rotated in the second direction (refer to FIGS. 1, 8, and 9).

The biasing means 13 is disposed below the lower plate 17, and includes a base plate 35, a coil spring 36 disposed on the base plate 35, an annular plate 37 supported by an upper end of the coil spring 36, a roller 38 rotatably attached to an upper surface of the annular plate 37, and a guide rod 39.

The main shaft 12 extends in the vertical direction and penetrates through the main shaft penetration member 14 (corresponding to the basal end portion of the cam arm 9), the basal end portion 21a of the first support member 21 (corresponding to the basal end portion of the large-diameter wheel arm 10), and the basal end portion 29a of the second support member 29 (corresponding to the basal end portion of the small-diameter wheel arm 11).

More specifically, the main shaft 12 extends upward from the base plate 35, sequentially passes through the inner side of the coil spring 36 and the inner side of the annular plate 37, and then sequentially passes through the lower plate 17, the basal end portion 21a of the first support member 21 (corresponding to the basal end portion of the large-diameter wheel arm 10), the spacer 23, the basal end portion 29a of the second support member 29 (corresponding to the basal end portion of the small-diameter wheel arm 11), and the upper plate 16. The fixation pin 24 penetrates through the spacer 23 and is pierced into the main shaft 12, and thus the spacer 23 is fixed to the main shaft 12.

As illustrated in FIGS. 2 to 4 and 7, a protrusion 46 is provided on a lower surface of the lower plate 17. The protrusion 46 has a tapered surface 45 (FIG. 7), and the tapered surface 45 is inclined in the second direction toward the lower side.

Figure 8:
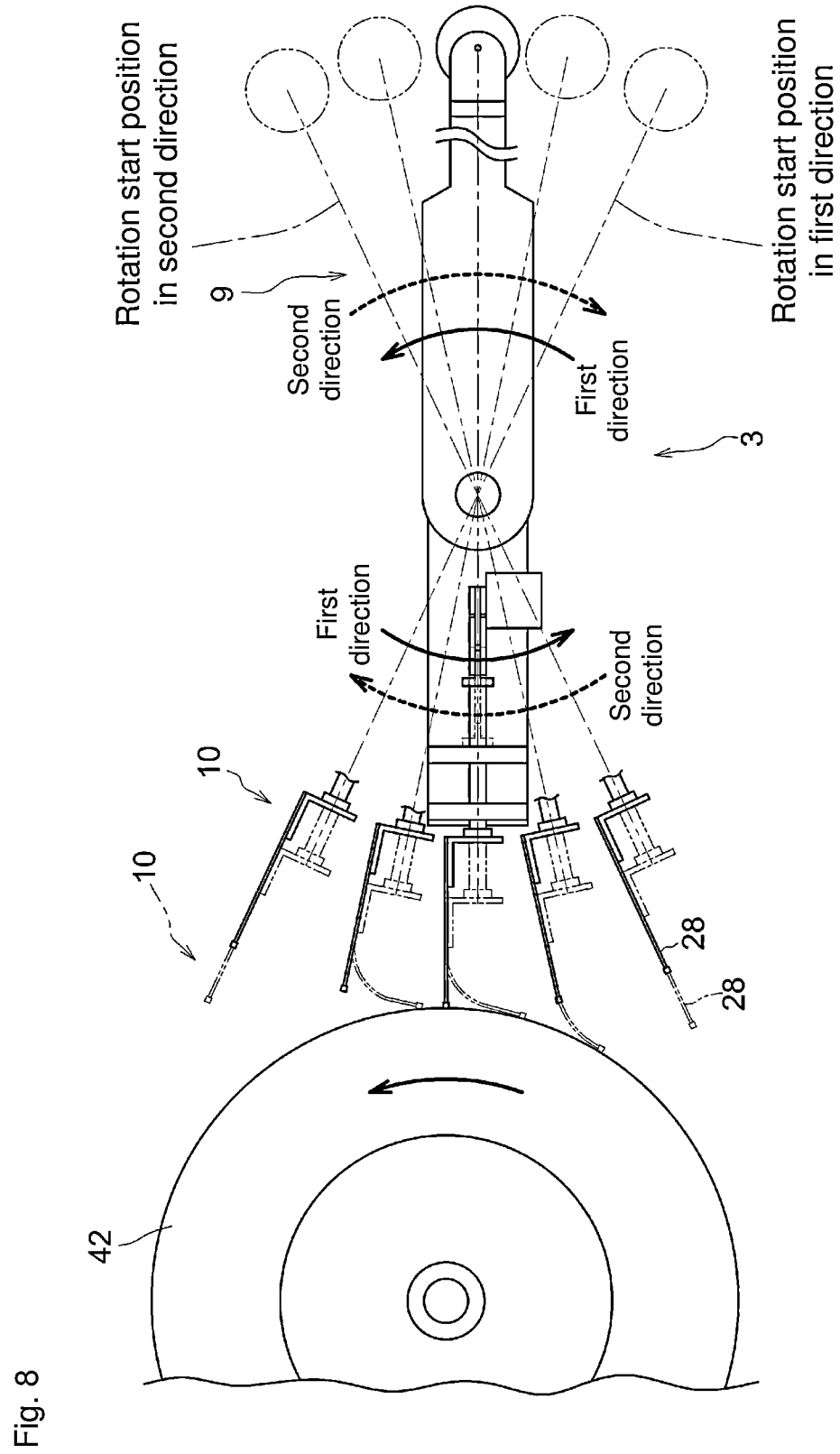
FIG. 8 is a schematic plan view illustrating an operation in a first mode.
Figure 9:
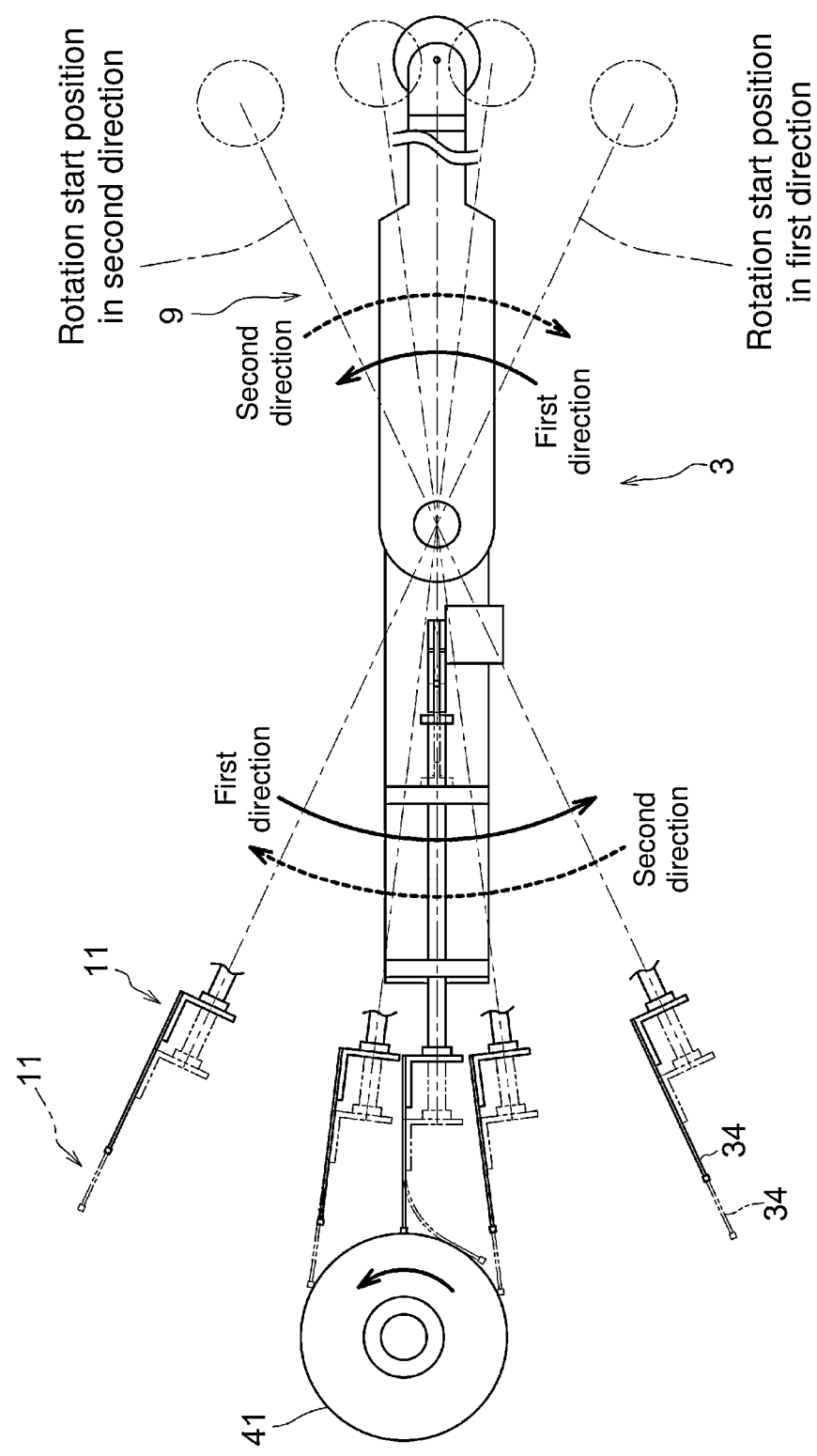
FIG. 9 is a schematic plan view illustrating an operation in a second mode.

According to the above configuration, every time the cam 6 comes into contact with the distal end portion of the cam arm 9 (the distal end portion of the cam arm body 15) through the rotation of the cam member 7, the cam arm 9 is rotated about the main shaft 12 in the first direction due to the pressing of the cam 6 (FIGS. 1, 8, and 9).

While the cam arm 9 is rotated in the first direction, the tapered surface 45 presses the roller 38 due to the rotation of the protrusion 46 in the first direction, so that the roller 38 rolls from the upper side to the lower side of the tapered surface 45, a downward force is applied from the annular plate 37 to the coil spring 36, and the coil spring 36 is compressed (from a state in FIG. 7(A) to a state in FIG. 7(B)). Thereafter, an upward force is applied from the coil spring 36 to the annular plate 37 due to elastic return of the coil spring 36, and the roller 38 presses the tapered surface 45 to bias the cam arm 9 in the second direction. As a result, the cam arm 9 reverses from the first direction and is rotated in the second direction, and accordingly, the roller 38 rolls from the lower side to the upper side of the tapered surface 45 (from the state in FIG. 7(B) to the state in FIG. 7(A)).

A timing at which the cam arm 9 reverses from the first direction to the second direction is a timing at which the cam 6 that has come into contact with the cam arm 9 does not come into contact with the cam arm 9 as the cam member 7 is rotated.

The guide rod 39 guides the vertical movement of the annular plate 37, and is provided outside the coil spring 36. The guide rod 39 extends upward from the base plate 35 and penetrates through the annular plate 37, and a bolt 40 is fastened to the upper end of the guide rod 39 extending from the annular plate 37. When an upward force is applied from the coil spring 36 to the annular plate 37 due to elastic return of the coil spring 36, the annular plate 37 comes into contact with the bolt 40, so that the annular plate 37 stops (FIG. 5(A)). Note that the guide rod 39 is not necessarily required and may be omitted.

The generator 4 (FIG. 1) includes a rotation body 44 in which a small-diameter wheel 41 and a large-diameter wheel 42 having a larger outer diameter than that of the small-diameter wheel are attached to a rotation shaft 43. In the generator 4, the arm mechanism 3 comes into contact with the outer circumferential surface of either the small-diameter wheel 41 or the large-diameter wheel 42 during the rotation of the arm mechanism 3, so that the rotation body 44 is rotated, and the rotational energy of the rotation body 44 is converted into electric energy to generate power.

While the operation control means is operating in a first mode in which the arm mechanism 3 is brought into contact with the large-diameter wheel 42, the operation control means transitions to an operation in a second mode in which the arm mechanism 3 is brought into contact with the small-diameter wheel 41 in response to an increase in the rotational speed of the rotation body 44 to a first value, and transitions to the operation in the first mode in response to a decrease in the rotational speed of the rotation body 44 to a second value that is equal to or smaller than the first value while the operation control means is operating in the second mode.

FIG. 8 is a schematic plan view illustrating an operation in the first mode. As the operation in the first mode, the operation control means rotates only the large-diameter wheel arm 10 out of the large-diameter wheel arm 10 and the small-diameter wheel arm 11 together with the cam arm 9 in the first direction, and then reverses the large-diameter wheel arm 10 to be rotated in the second direction, and does not bring the large-diameter wheel arm 10 into contact with the large-diameter wheel 42 by bringing the large-diameter wheel arm 10 into a retracted state while the large-diameter wheel arm 10 is being rotated in the first direction, and brings the large-diameter wheel arm 10 into contact with the outer circumferential surface of the large-diameter wheel 42 by bringing the large-diameter wheel arm 10 into a stretched state while the large-diameter wheel arm 10 is being rotated in the second direction. As a result, a large torque corresponding to the diameter of the large-diameter wheel 42 is applied to the rotation body 44.

FIG. 9 is a schematic plan view illustrating an operation in the second mode. As the operation in the second mode, the operation control means rotates only the small-diameter wheel arm 11 out of the large-diameter wheel arm 10 and the small-diameter wheel arm 11 together with the cam arm 9 in the first direction and then reverses the small-diameter wheel arm 11 to be rotated in the second direction, and does not bring the small-diameter wheel arm 11 into contact with the small-diameter wheel 41 by bringing the small-diameter wheel arm 11 into a retracted state while the small-diameter wheel arm 11 is being rotated in the first direction, and brings the small-diameter wheel arm 11 into contact with the outer circumferential surface of the small-diameter wheel 41 having a small outer diameter by bringing the small-diameter wheel arm 11 into a stretched state while the small-diameter wheel arm 11 is being rotated in the second direction.

Figure 10:
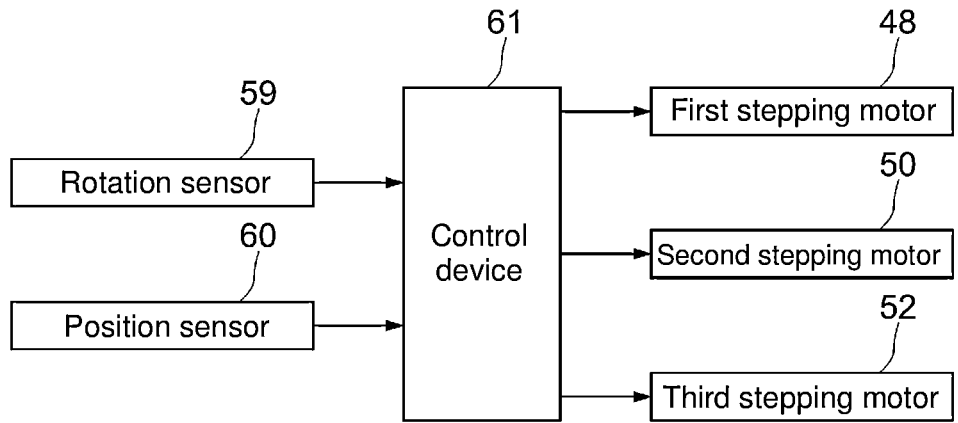
FIG. 10 is a block diagram illustrating a main configuration of operation control means.

The operation control means includes, as means for executing the operations in the first and second modes, a first stepping motor 48 having a first motor shaft 47, a second stepping motor 50 having a second motor shaft 49 (FIGS. 2 and 5), a third stepping motor 52 having a third motor shaft 51 (FIGS. 2 and 6), a first cam 53, a second cam 54, a first stopper 55, a second stopper 56, a first stopper spring 57 (FIGS. 3 and 4), a second stopper spring 58 (FIGS. 3 and 4), a rotation sensor 59 (FIG. 10), a position sensor 60 (FIG. 10), and a control device 61 (FIG. 10).

The first cam 53 and the second cam 54 are attached to the first motor shaft 47 of the first stepping motor 48 with a gap therebetween. The first cam 53 and the second cam 54 have the same shape, but are attached to the first motor shaft 47 in different directions. In the illustrated example, the first cam 53 and the second cam 54 have an elliptical shape, and are attached to the first motor shaft 47 such that an orientation of the first cam 53 is perpendicular to an orientation of the second cam 54.

The first stepping motor 48 is supported by the upper plate 16 or the lower plate 17 such that the first motor shaft 47 extends in the space 19 in the vertical direction, the first cam 53 faces the basal end portion 21*a* of the first support member 21 (corresponding to the basal end portion of the large-diameter wheel arm 10), and the second cam 54 faces the basal end portion 29*a* of the second support member 29 (corresponding to the basal end portion of the small-diameter wheel arm 11) (in the illustrated example, the first stepping motor 48 is supported by the upper plate 16).

The first stopper 55 passes through a first through-hole 62 (FIGS. 3 and 4) of the coupling plate 18 so as to be movable between the basal end portion 21*a* of the first support member 21 (corresponding to the basal end portion of the large-diameter wheel arm 10) and the first cam 53. The first stopper spring 57 is a coil spring through which the first stopper 55 passes, and is sandwiched between a first flange portion 55*a* and the coupling plate 18. The first flange portion 55*a* protrudes from an outer periphery of the first stopper 55.

The second stopper 56 passes through the second through-hole 63 (FIGS. 3 and 4) of the coupling plate 18 so as to be movable between the basal end portion 29*a* of the second support member 29 (corresponding to the basal end portion of the small-diameter wheel arm 11) and the second cam 54. The second stopper spring 58 is a coil spring through which the second stopper 56 passes, and is sandwiched between a second flange portion 56*a* and the coupling plate 18. The second flange portion 56*a* protrudes from an outer periphery of the second stopper 56.

A first recess 64 (FIGS. 3 and 4) for fitting one end portion of the first stopper 55 is provided in the basal end portion 21*a* of the first support member 21 (corresponding to the basal end portion of the large-diameter wheel arm 10).

A second recess 65 (FIGS. 3 and 4) for fitting one end portion of the second stopper 56 is provided in the basal end portion 29a of the second support member 29 (corresponding to the basal end portion of the small-diameter wheel arm 11).

According to the above configuration, when the first motor shaft 47 is rotated forward through driving of the first stepping motor 48, as illustrated in FIG. 3, the first cam 53 presses the first stopper 55 toward the large-diameter wheel arm 10 side (left side in FIG. 3), the first stopper spring 57 is compressed, one end portion of the first stopper 55 is fitted into the first recess 64, pressing of the second stopper 56 by the second cam 54 is released, the second stopper spring 58 is elastically returned, and one end portion of the second stopper 56 is detached from the second recess 65 (not illustrated). As a result, only the large-diameter wheel arm 10 of the arms 10 and 11 is rotated in the first direction together with the cam arm 9, and is then reversed and rotated in the second direction (FIG. 8).

When the first motor shaft 47 is rotated backward through driving of the first stepping motor 48, as illustrated in FIG. 4, the pressing of the first stopper 55 by the first cam 53 is released, the first stopper spring 57 is elastically returned, one end portion of the first stopper 55 is detached from the first recess 64, and the second cam 54 presses the second stopper 56 toward the small-diameter wheel arm 11 side (left side in FIG. 4), the second stopper spring 58 is compressed, and one end portion of the second stopper 56 is fitted into the second recess 65. As a result, out of the arms 10 and 11, only the small-diameter wheel arm 11 is rotated in the first direction together with the cam arm 9, and is then reversed and rotated in the second direction (FIG. 9).

Figure 11:
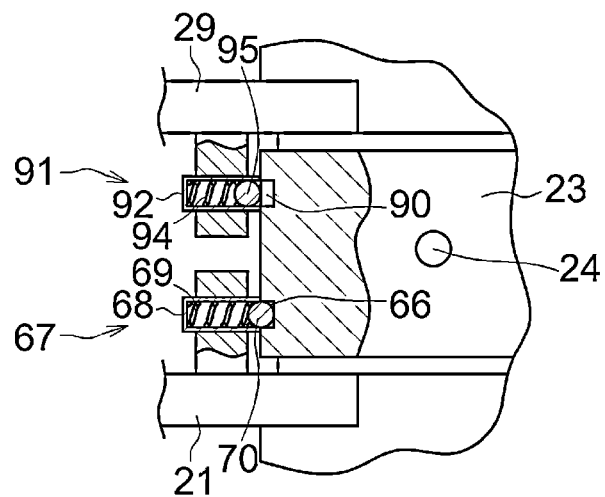
FIGS. 11(A) and 11(B) are enlarged cross-sectional views illustrating a part of the arm mechanism.
Figure 11:
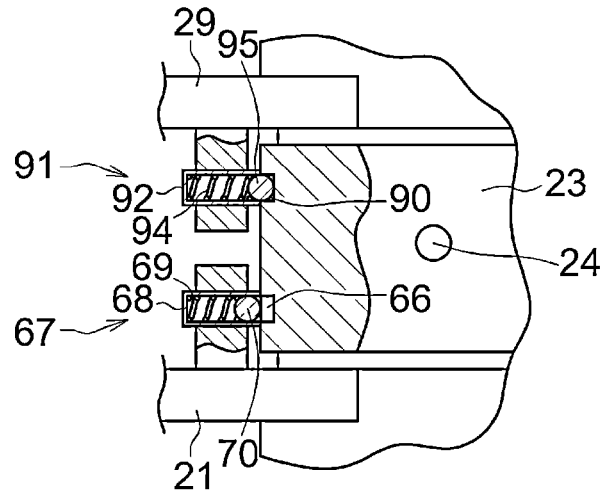

FIG. 11 is an enlarged cross-sectional view illustrating a part of the arm mechanism 3. In the present embodiment, in order to smoothly fit one end portion of the first stopper 55 into the first recess 64 (refer to FIG. 3), as illustrated in FIG. 11, a third recess 66 is provided in the spacer 23, and a first fixation plunger 67 is provided in the first support member 21. The first fixation plunger 67 includes a first cylinder 68 that is fixed to the first support member 21 and is open toward the spacer 23, a spring 69 disposed in the first cylinder 68, and a first ball 70 attached to an end portion of the spring 69 on the spacer 23 side. The third recess 66 is provided at a position facing the first ball 70. As illustrated in FIG. 4, since one end portion of the first stopper 55 is not fitted into the first recess 64, while the large-diameter wheel arm 10 is not rotated together with the cam arm 9, as illustrated in FIG. 11(A), the first ball 70 is fitted into the third recess 66 by the elasticity of the spring 69, so that the movement of the large-diameter wheel arm 10 can be stopped. As a result, when the cam arm 9 extends on the same straight line as the large-diameter wheel arm 10, the one end portion of the first stopper 55 can be smoothly fitted into the first recess 64 by pressing the first stopper 55 with the first cam 53.

In order to smoothly fit one end portion of the second stopper 56 into the second recess 65 (refer to FIG. 4), as illustrated in FIG. 11, a fourth recess 90 is provided in the spacer 23, and a second fixation plunger 91 is provided in the second support member 29. The second fixation plunger 91 includes a second cylinder 92 that is fixed to the second support member 29 and is open toward the spacer 23, a spring 94 disposed in the second cylinder 92, and a second ball 95 attached to an end portion of the spring 94 on the spacer 23 side. The fourth recess 90 is provided at a position facing the second ball 95. As illustrated in FIG. 3, since one end portion of the second stopper 56 is not fitted into the second recess 65, while the small-diameter wheel arm 11 is not rotated together with the cam arm 9, as illustrated in FIG. 11(B), the second ball 95 is fitted into the fourth recess 90 by the elasticity of the spring 94, so that the movement of the small-diameter wheel arm 11 can be stopped. As a result, when the cam arm 9 extends in the same straight line as the small-diameter wheel arm 11, one end portion of the second stopper 56 can be smoothly fitted into the second recess 65 by pressing the second stopper 56 with the second cam 54.

The second stepping motor 50 is supported by the first support member 21, and the second motor shaft 49 is connected to the basal end portion of the first joint body 25 (FIGS. 2 and 5). When the second motor shaft 49 is rotated forward, the first joint body 25 and the second joint body 26 become linear, and the first rod 27 and the first elastic member 28 are moved toward the generator 4 due to the pressing of the second joint body 26 (FIG. 5(B)). As a result, the large-diameter wheel arm 10 is stretched. When the second motor shaft 49 is rotated backward, the first joint body 25 and the second joint body 26 are bent, and the first rod 27 and the first elastic member 28 are moved toward the cam device 2 due to the traction of the second joint body 26 (FIG. 5(A)). As a result, the large-diameter wheel arm 10 is retracted.

The third stepping motor 52 is supported by the second support member 29, and the third motor shaft 51 is connected to the basal end portion of the third joint body 31 (FIGS. 2 and 6). When the third motor shaft 51 is rotated forward, the third joint body 31 and the fourth joint body 32 become linear, and the second rod 33 and the second elastic member 34 are moved toward the generator 4 due to the pressing of the fourth joint body 32 (FIG. 6(B)). As a result, the small-diameter wheel arm 11 is stretched. When the third motor shaft 51 is rotated backward, the third joint body 31 and the fourth joint body 32 are bent, and the second rod 33 and the second elastic member 34 are moved toward the cam device 2 due to the traction of the fourth joint body 32 (FIG. 6(A)). As a result, the small-diameter wheel arm 11 is retracted.

The rotation sensor 59, the position sensor 60, and the control device 61 illustrated in FIG. 10 are operated by electric power generated by the generator 4.

The rotation sensor 59 is installed in the generator 4 and measures a rotational speed of the rotation body 44 (FIG. 1) (the number of rotations per unit time of the rotation body 44). As the rotation sensor 59, a known optical sensor or ultrasonic sensor may be used.

The position sensor 60 can detect that the cam arm 9 has reached a rotation start position (FIGS. 8 and 9) in the first direction and that the cam arm 9 has reached a rotation start position (FIGS. 8 and 9) in the second direction. As the position sensor 60, an optical sensor or a sensor that can specify a position of the cam arm when a limit switch comes into contact with the cam arm may be used.

The control device 61 is, for example, a small computer provided on an operation panel (not illustrated) of the power generation system 1. The control device 61 includes a CPU, a memory, an interface, and an input device. The control device 61 is connected to the rotation sensor 59, the position sensor 60, and the first, second, and third stepping motors 48, 50, and 52 via the interface, and can acquire a measurement value of the rotation sensor 59 and a detection result of the position sensor 60, and can rotate each of the first, second, and third motor shafts 47, 49, and 51 forward and backward.

Figure 12:
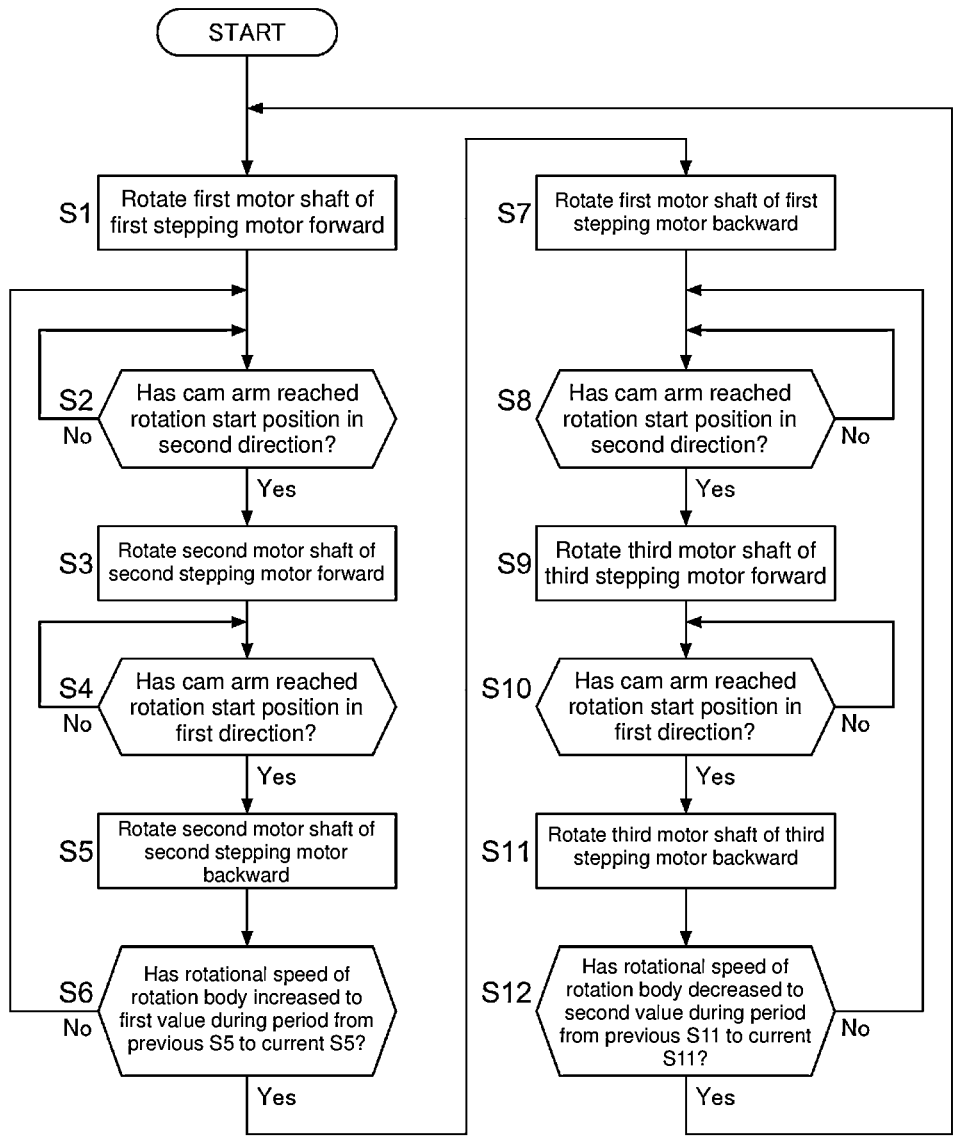
FIG. 12 is a flowchart illustrating processing executed by a control device.

The control device 61 performs processing illustrated in FIG. 12 by the CPU executing a program stored in the memory. The processing illustrated in FIG. 12 is started in response to execution of a predetermined operation on an input unit of the control device 61 in a state in which the cam member 7 is rotated by hydroelectric power or wind power, the cam 6 comes into contact with the arm mechanism 3, and the arm mechanism 3 is sequentially rotated in the first direction and the second direction. The processes in S1 to S5 in FIG. 12 realize the operation in the first mode described above, and the processes in S7 to S11 in FIG. 12 realize the operation in the second mode described above. Hereinafter, the processing illustrated in FIG. 12 will be described.

The control device 61 rotates the first motor shaft 47 of the first stepping motor 48 forward in response to a predetermined operation performed on the input unit (S1). As a result, as illustrated in FIG. 3, one end portion of the first stopper 55 is fitted into the first recess 64, and one end portion of the second stopper 56 is detached from the second recess 65, so that only the large-diameter wheel arm 10 of the arms 10 and 11 is rotated in the first direction together with the cam arm 9, and is then reversed and rotated in the second direction (FIG. 8).

Next, in response to the position sensor 60 detecting that the cam arm 9 has reached the rotation start position in the second direction (FIG. 8) (YES in S2), the control device 61 rotates the second motor shaft 49 of the second stepping motor 50 forward (S3). As a result, while the large-diameter wheel arm 10 is being rotated in the second direction, the large-diameter wheel arm 10 is stretched (FIG. 5(B)), the first elastic member 28 of the large-diameter wheel arm 10 comes into contact with the large-diameter wheel 42 (FIG. 8), and the rotation body 44 (FIG. 1) is rotated due to this contact.

Next, in response to the position sensor 60 detecting that the cam arm 9 has reached the rotation start position in the first direction (FIG. 8) (YES in S4), the control device 61 rotates the second motor shaft 49 of the second stepping motor 50 backward (S5). As a result, while the large-diameter wheel arm 10 is being rotated in the first direction, the large-diameter wheel arm 10 is retracted (FIG. 5(A)) and does not come into contact with the large-diameter wheel 42 that is being rotated (FIG. 8). This prevents a decrease in the rotational speed of the rotation body 44 (FIG. 1).

Next, the control device 61 determines whether or not the rotation sensor 59 detects that the rotational speed of the rotation body 44 has increased to the first value during a period from the previous backward rotation of the second motor shaft 49 to the current backward rotation of the second motor shaft 49 (from the previous S5 to the current S5) (S6). While the rotational speed of the rotation body 44 has not increased to the first value, the control device 61 determines NO in S6 and repeatedly performs S2 to S6. Between S3 and S5 of each time (while the large-diameter wheel arm 10 is being rotated in the second direction), the first elastic member 28 of the large-diameter wheel arm 10 comes into contact with the large-diameter wheel 42 (FIG. 4).

In a case where the rotational speed of the rotation body 44 has increased to the first value due to repeated contact between the first elastic member 28 and the wheel 42, the control device 61 determines YES in S6 and rotates the first motor shaft 47 of the first stepping motor 48 backward (S7). As a result, as illustrated in FIG. 4, one end portion of the first stopper 55 is detached from the first recess 64, and one end portion of the second stopper 56 is fitted into the second recess 65, so that only the small-diameter wheel arm 11 of the arms 10 and 11 is rotated in the first direction together with the cam arm 9, and is then reversed and rotated in the second direction (FIG. 9).

Next, in response to the position sensor 60 detecting that the cam arm 9 has reached the rotation start position in the second direction (FIG. 9) (YES in S8), the control device 61 rotates the third motor shaft 51 of the third stepping motor 52 forward (S9). As a result, while the small-diameter wheel arm 11 is being rotated in the second direction, the small-diameter wheel arm 11 is stretched (FIG. 6(B)), and the second elastic member 34 of the small-diameter wheel arm 11 comes into contact with the small-diameter wheel 41.

Next, in response to the position sensor 60 detecting that the cam arm 9 has reached the rotation start position (FIG. 9) in the first direction (YES in S10), the control device 61 rotates the third motor shaft 51 of the third stepping motor 52 backward (S11). As a result, while the small-diameter wheel arm 11 is being rotated in the first direction, the small-diameter wheel arm 11 is retracted (FIG. 6(A)) and does not come into contact with the small-diameter wheel 41 that is being rotated (FIG. 9). This prevents a decrease in the rotational speed of the rotation body 44 (FIG. 1).

Next, the control device 61 determines whether or not the rotation sensor 59 detects that the rotational speed of the rotation body 44 has decreased to the second value during a period from the previous backward rotation of the third motor shaft 51 to the current backward rotation of the third motor shaft 51 (from the previous S11 to the current S11) (S12). While the rotational speed of the rotation body 44 has not decreased to the second value, the control device 61 determines NO in S12 and repeatedly performs S8 to S12, and the second elastic member 34 of the small-diameter wheel arm 11 comes into contact with the small-diameter wheel 41 between S9 and S11 of each time (while the small-diameter wheel arm 11 is being rotated in the second direction). During this time, since the outer diameter of the wheel with which the arm mechanism 3 comes into contact is small, the rotational speed of the rotation body 44 is maintained or further increased.

For example, in a case where the rotational speed of the cam member 7 is reduced due to weakening of hydroelectric power or wind power for rotating the cam member 7, a time interval at which the cam 6 comes into contact with the arm mechanism 3 and a time interval at which the arm mechanism 3 comes into contact with the small-diameter wheel 41 become long, and thus the rotational speed of the rotation body 44 decreases. As a result, when the rotational speed of the rotation body 44 has decreased to the second value, the control device 61 determines YES in S12 and returns to S1. As a result, the first motor shaft 47 of the first stepping motor 48 is rotated forward, one end portion of the second stopper 56 is detached from the second recess 65, and one end portion of the first stopper 55 is fitted into the first recess 64, so that the large-diameter wheel arm 10 is rotated together with the cam arm 9 in the first direction, and is then reversed and rotated in the second direction, and the processes in S2 and subsequent steps described above are executed.

According to the embodiment described above, the operation in the first mode in which the arm mechanism 3 is brought into contact with the large-diameter wheel 42 is performed until the rotational speed of the rotation body 44 increases to the first value. As a result, a large torque can be applied to the rotation body 44 until the rotational speed of the rotation body 44 increases to the first value. In response to the increase in the rotational speed of the rotation body 44 to the first value, a transition to the operation in the second mode in which the small-diameter wheel 41 is brought into contact with the arm mechanism 3 occurs. As a result, after the rotational speed of the rotation body 44 has increased to the first value, the outer diameter of the wheel with which the arm mechanism 3 is brought into contact is reduced (that is, the wheel to be brought into contact with the arm mechanism 3 is changed from the large-diameter wheel 42 to the small-diameter wheel 41), and the rotational speed of the rotation body 44 can be maintained or further increased. By achieving the above effect, an amount of power generated by the generator 4 can be increased and the amount of power generated by the generator 4 can be maintained.

The present invention is not limited to the above-described embodiments, and various modifications can be made.

Figure 13:
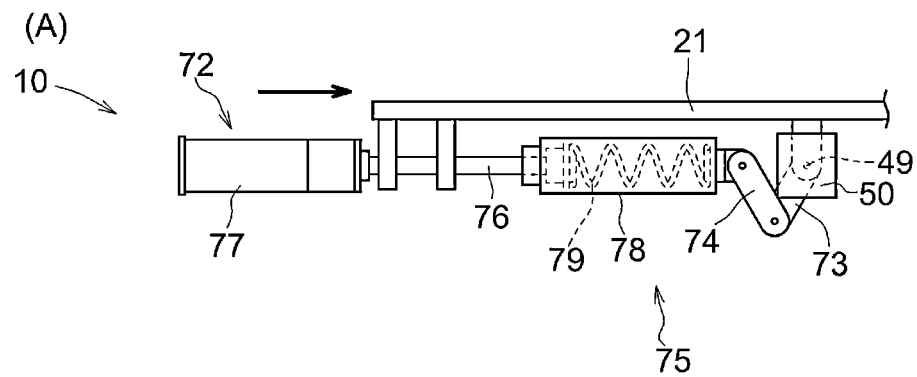
FIGS. 13(A), 13(B), and 13(C) are side views illustrating a large-diameter wheel arm of a modification example.
Figure 13:
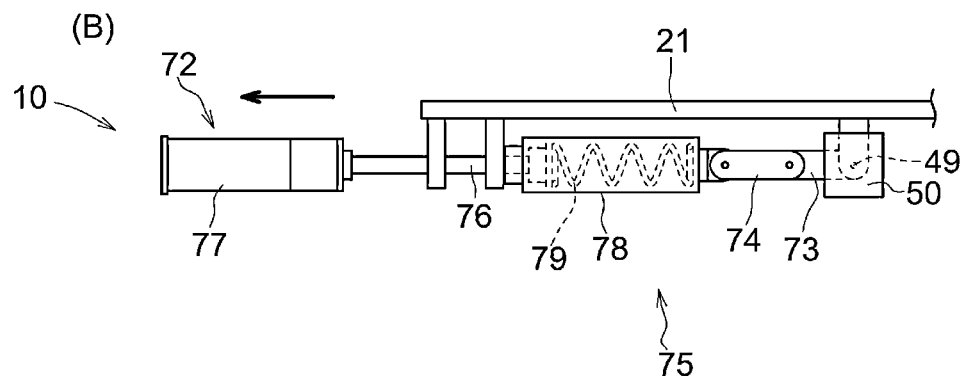
Figure 13:
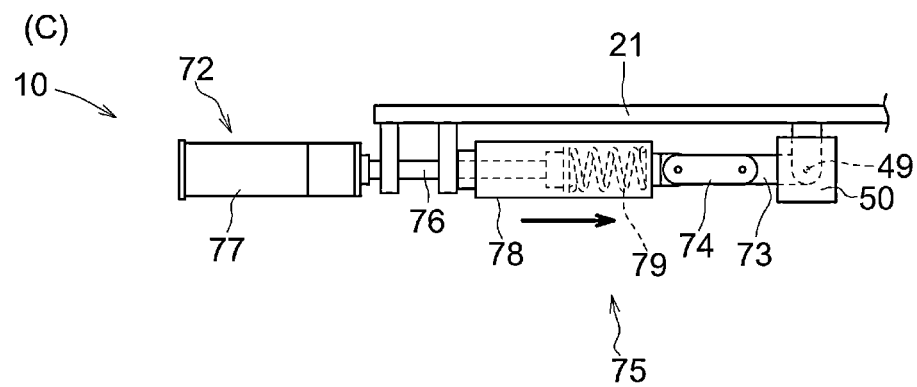
Figure 14:
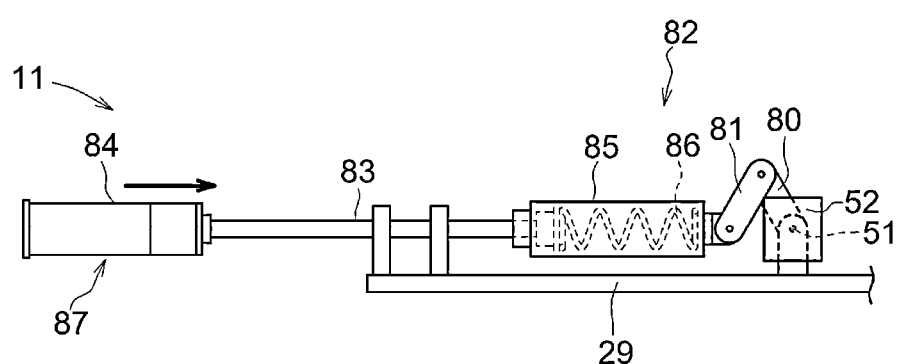
FIGS. 14(A), 14(B), and 14(C) are side views illustrating a small-diameter wheel arm of a modification example.
Figure 14:
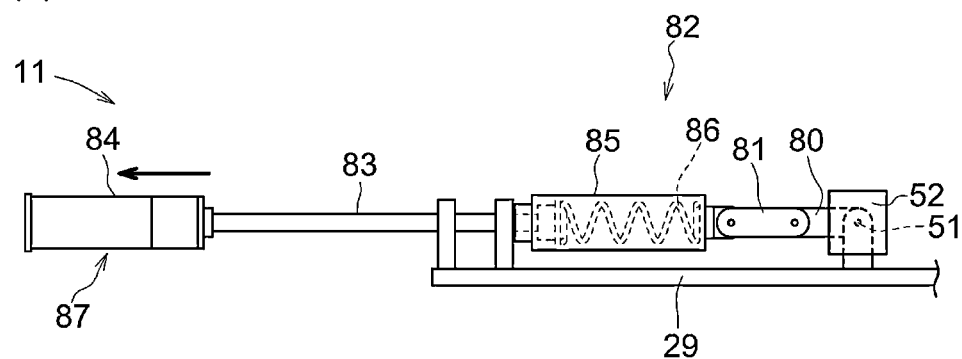
Figure 14:
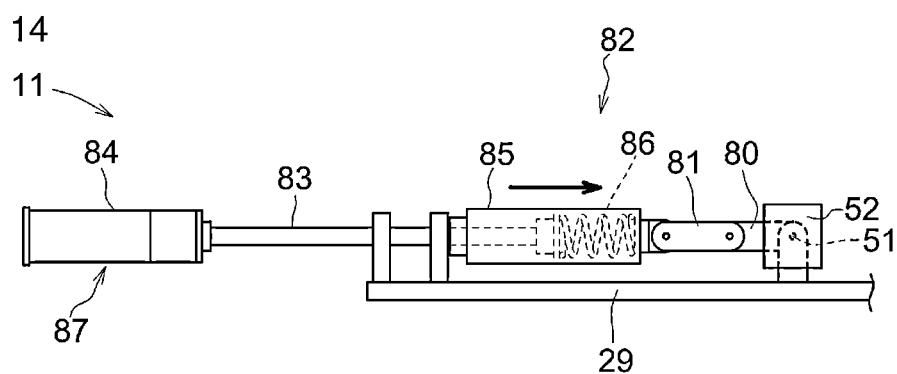

For example, a first movable body 72 illustrated in FIG. 13 may be used instead of the first movable body 22 illustrated in FIG. 5, and a second movable body 87 illustrated in FIG. 14 may be used instead of the second movable body 30 illustrated in FIG. 6 (that is, the large-diameter wheel arm 10 may include the first support member 21 and the first movable body 72 illustrated in FIG. 13, and the small-diameter wheel arm 11 may include the second support member 29 and the second movable body 87 illustrated in FIG. 14).

As illustrated in FIG. 13, the first movable body 72 includes a first joint body 73, a second joint body 74, a first absorber 75, a first rod 76, and a first elastic member 77, and the first rod 76 is movably supported by the first support member 21.

The first absorber 75 includes a first cylinder 78 having an opening at a distal end thereof, and a first spring 79 disposed inside the first cylinder 78.

In the first movable body 72, a distal end portion of the first joint body 73 and a basal end portion of the second joint body 74 are hinge-coupled, a distal end portion of the second joint body 74 and a basal end portion of the first cylinder 78 are hinge-coupled, a basal end portion of the first spring and the basal end portion of the first cylinder 78 are connected, and a distal end portion of the first spring 79 and a basal end portion of the first rod 76 are connected. The first elastic member 77 extends from the distal end portion of the first rod 76 and configures the distal end portion of the large-diameter wheel arm 10. The second motor shaft 49 of the second stepping motor 50 is connected to the basal end portion of the first joint body 73.

As illustrated in FIG. 14, the second movable body 87 includes a third joint body 80, a fourth joint body 81, a second absorber 82, a second rod 83, and a second elastic member 84, and the second rod 83 is movably supported by the second support member 29.

The second absorber 82 includes a second cylinder 85 having an opening at a distal end thereof and a second spring 86 disposed inside the second cylinder 85.

In the second movable body 87, a distal end portion of the third joint body 80 and a basal end portion of the fourth joint body 81 are hinge-coupled, a distal end portion of the fourth joint body 81 and a basal end portion of the second cylinder 85 are hinge-coupled, and a distal end portion of the second spring 86 and a basal end portion of the second rod 83 are connected. The second elastic member 84 extends from the distal end portion of the second rod 83 and configures the distal end portion of the small-diameter wheel arm 11. The third motor shaft 51 of the third stepping motor 52 is connected to the basal end portion of the third joint body 80.

Even in a case where the first movable body 72 and the second movable body 87 are used, the operation control means extends the large-diameter wheel arm 10 while the large-diameter wheel arm 10 is being rotated in the second direction (FIGS. 8 and 13(B)). This is realized as follows: In response to the position sensor 60 detecting that the cam arm 9 has reached the rotation start position in the second direction (YES in S2 in FIG. 12), the control device 61 rotates the second motor shaft 49 of the second stepping motor 50 forward (S3 in FIG. 12), so that the first joint body 73 and the second joint body 74 become linear, and the first cylinder 78, the first spring 79, the first rod 76, and the first elastic member 77 are moved toward the generator 4 (left side in FIG. 13) (FIG. 13(B)). As a result, while the large-diameter wheel arm 10 is rotated in the second direction, the first elastic member 77 comes into contact with the large-diameter wheel 42 (FIG. 8).

While the large-diameter wheel arm 10 is being rotated in the first direction, the operation control means retracts the large-diameter wheel arm 10 (FIGS. 8 and 13(A)). This is realized as follows: In response to the position sensor 60 detecting that the cam arm 9 has reached the rotation start position in the first direction (YES in S4 in FIG. 12), the control device 61 rotates the second motor shaft 49 of the second stepping motor 50 backward (S5 in FIG. 12), so that the first joint body 73 and the second joint body 74 are bent, and the first cylinder 78, the first spring 79, the first rod 76, and the first elastic member 77 are moved toward the cam device 2 (right side in FIG. 13) (FIG. 13(A)). As a result, while the large-diameter wheel arm 10 is being rotated in the first direction, the first elastic member 77 does not come into contact with the large-diameter wheel 42 (FIG. 8).

While the small-diameter wheel arm 11 is being rotated in the second direction, the operation control means extends the small-diameter wheel arm 11 (FIGS. 9 and 14(B)). This is realized as follows: In response to the position sensor 60 detecting that the cam arm 9 has reached the rotation start position in the second direction (YES in S8 in FIG. 12), the control device 61 rotates the third motor shaft 51 of the third stepping motor 52 forward (S9 in FIG. 12), so that the third joint body 80 and the fourth joint body 81 become linear, and the second cylinder 84, the second spring 84, the second rod 83, and the second elastic member 84 are moved toward the generator 4 (left side in FIG. 14) (FIG. 14(B)). As a result, while the small-diameter wheel arm 11 is being rotated in the second direction, the first elastic member 77 comes into contact with the large-diameter wheel 42 (FIG. 9).

While the small-diameter wheel arm 11 is being rotated in the first direction, the operation control means retracts the small-diameter wheel arm 11 (FIGS. 9 and 14(A)). This is realized as follows: In response to the position sensor 60 detecting that the cam arm 9 has reached the rotation start position in the first direction (YES in S10 in FIG. 12), the control device 61 rotates the third motor shaft 51 of the third stepping motor 52 backward (S11 in FIG. 12), so that the third joint body 80 and the fourth joint body 81 are bent, and the second rod 83 and the second elastic member 84 are moved toward the cam device 2 (right side in FIG. 14) due to the traction of the second spring 84 (FIG. 14(A)). As a result, while the small-diameter wheel arm 11 is being rotated in the first direction, the second elastic member 84 does not come into contact with the small-diameter wheel 41 (FIG. 9).

In a case where the first movable body 72 and the second movable body 87 are used, the first elastic member 77 can be strongly pressed against the large-diameter wheel 42 due to the elasticity of the first spring 79, and the second elastic member 84 can be strongly pressed against the small-diameter wheel 41 due to the elasticity of the second spring 86 (FIG. 13(C) illustrates a state of the first movable body 72 when the first elastic member 77 is strongly pressed against the large-diameter wheel 42, and FIG. 14(C) illustrates a state of the second movable body 87 when the second elastic member 84 is strongly pressed against the small-diameter wheel 41).

In the above embodiment, the example has been described in which the large-diameter wheel arm 10 is provided below the small-diameter wheel arm 11 since the large-diameter wheel 42 is provided below the small-diameter wheel 41. However, the large-diameter wheel 42 may be provided above the small-diameter wheel 41, and accordingly, the large-diameter wheel arm 10 may be provided above the small-diameter wheel arm 11. In this case, the main shaft 12 sequentially passes through the inner side of the coil spring 36 and the inner side of the annular plate 37, and then sequentially passes through the lower plate 17, the basal end portion 29*a* of the second support member 29 (corresponding to the basal end portion of the small-diameter wheel arm 11), the spacer 23, the basal end portion 21*a* of the first support member 21 (corresponding to the basal end portion of the large-diameter wheel arm 10), and the upper plate 16.

In the above embodiment, the example in which the spacer 23 is provided between the basal end portion of the large-diameter wheel arm and the basal end portion of the small-diameter wheel arm has been described, but the spacer 23 is not necessarily required and may be omitted. In a case where the spacer 23 is omitted, the third recess 66, the first fixation plunger 67, the fourth recess 90, and the second fixation plunger 91 illustrated in FIG. 11 are also omitted, but even if these constituents are omitted, as illustrated in FIG. 3, one end of the first stopper 55 can be fitted into the first recess 64 by pressing the first cam 53 against the first stopper 55, and as illustrated in FIG. 4, one end of the second stopper 56 can be fitted into the second recess 65 by pressing the second cam 54 against the second stopper 56.

In the above embodiment, the example in which the basal end portion of the cam arm 9 is configured by the main shaft penetration member 14 has been described. However, a structure of the basal end portion of the cam arm 9 can also be changed to various structures capable of realizing the above-described function of the present invention. Even in a case where the structure of the basal end portion of the cam arm 9 is changed or the spacer 23 is omitted as described above, the main shaft 12 penetrates through the basal end portion of the cam arm 9, the basal end portion 21*a* of the large-diameter wheel arm 10, and the basal end portion 29*a* of the small-diameter wheel arm 11, so that the cam arm 9, the large-diameter wheel arm 10, and the small-diameter wheel arm 11 can be rotated as described above.

In the above embodiment, the example in which a single main shaft 12 passes through the basal end portion (main shaft penetration member 14) of the cam arm 9, the basal end portion 21*a* of the large-diameter wheel arm 10, and the basal end portion 29*a* of the small-diameter wheel arm 11 has been described. However, a shaft passing through the basal end portion of the cam arm 9, a shaft passing through the basal end portion 29*a* of the small-diameter wheel arm 11, and a shaft passing through the basal end portion 21*a* of the large-diameter wheel arm 10 may be separately provided.

In the above embodiment, the example has been described in which the arm mechanism 3 includes the large-diameter wheel arm 10 as an arm for making contact with the large-diameter wheel 42, and includes the small-diameter wheel arm 11 as an arm for making contact with the small-diameter wheel 41. However, a single arm may be brought into contact with the large-diameter wheel 42 and the small-diameter wheel 41. In this case, for example, while the operation control means is operating in the first mode in which the arm is brought into contact with the large-diameter wheel 42, the operation control means transitions to the operation in the second mode in which the arm is brought into contact with the small-diameter wheel 41 by moving the arm to the position facing the small-diameter wheel 41 in response to an increase in the rotational speed of the rotation body 44 to the first value, and transitions to the operation in the first mode by moving the arm to the position facing the large-diameter wheel arm 10 in response to a decrease in the rotational speed of the rotation body 44 to the second value that is equal to or smaller than the first value while the operation control means is operating in the second mode.

Figure 15:
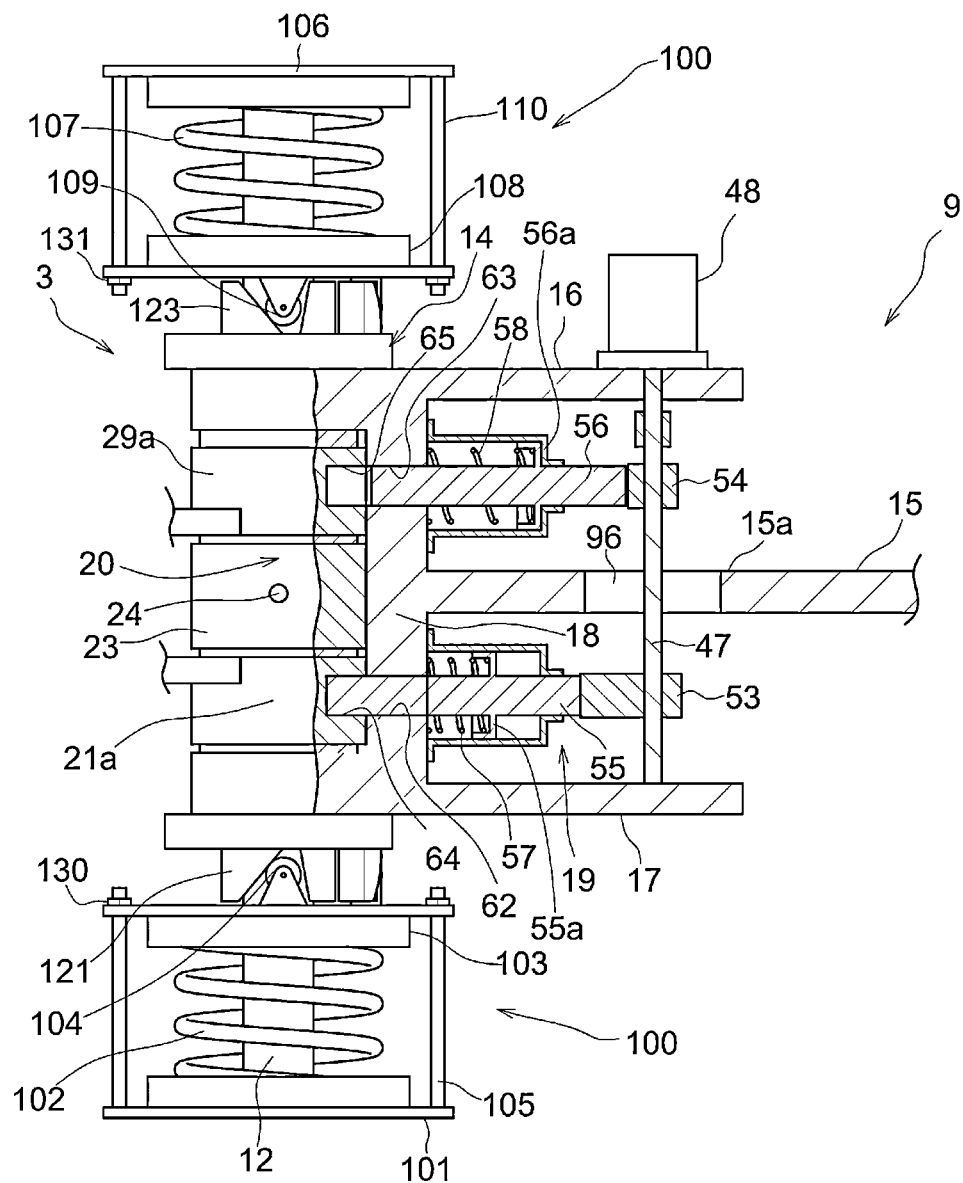
FIG. 15 is a side view illustrating a part of the arm mechanism, and illustrates biasing means of a modification example.

Biasing means included in the power generation system of the present invention is not limited to the biasing means 13 described in the above embodiment. The power generation system of the present invention may include, for example, biasing means 100 illustrated in FIG. 15.

The biasing means 100 includes a base plate 101, a first coil spring 102 disposed on the base plate 101, a first annular plate 103 supported by an upper end portion of the first coil spring 102, a first roller 104 rotatably attached to an upper surface of the first annular plate 103, a first guide rod 105, a top plate 106, a second coil spring 107 disposed below the top plate 106, a second annular plate 108 supported by a lower end portion of the second coil spring 107, a second roller 109 rotatably attached to a lower surface of the second annular plate 108, and a second guide rod 110.

The base plate 101, the first coil spring 102, the first annular plate 103, the first roller 104, and the first guide rod 105 are disposed below the lower plate 17. The top plate 106, the second coil spring 107, the second annular plate 108, the second roller 109, and the second guide rod 110 are disposed above the upper plate 16.

The main shaft 12 has a lower end joined to the base plate 101 and an upper end joined to the top plate 106. The main shaft 12 extends upward from the base plate 101, sequentially passes through the inside of the first coil spring 102 and the inside of the first annular plate 103, then sequentially passes through the lower plate 17, the basal end portion 21*a* of the first support member 21 (corresponding to the basal end portion of the large-diameter wheel arm 10), the spacer 23, the basal end portion 29*a* of the second support member 29 (corresponding to the basal end portion of the small-diameter wheel arm 11), and the upper plate 16, then sequentially passes through the inside of the second annular plate 108 and the inside of the second coil spring 107, and reaches the top plate 106. Similarly to the above embodiment, the fixation pin 24 penetrates through the spacer 23 and is pierced into the main shaft 12, and thus the spacer 23 is fixed to the main shaft 12.

Figure 16:
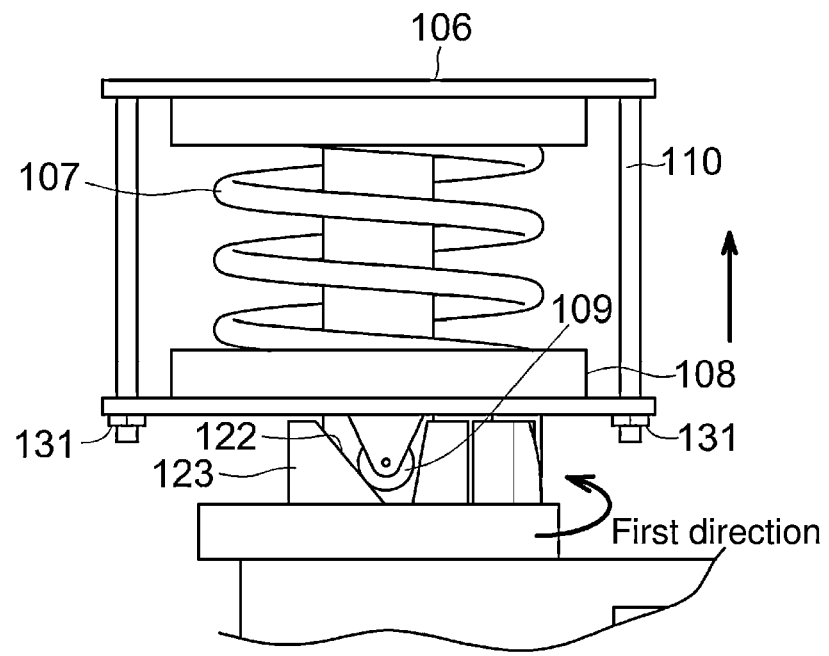
FIGS. 16(A) and 16(B) are side views illustrating biasing means of a modification example.
Figure 16:
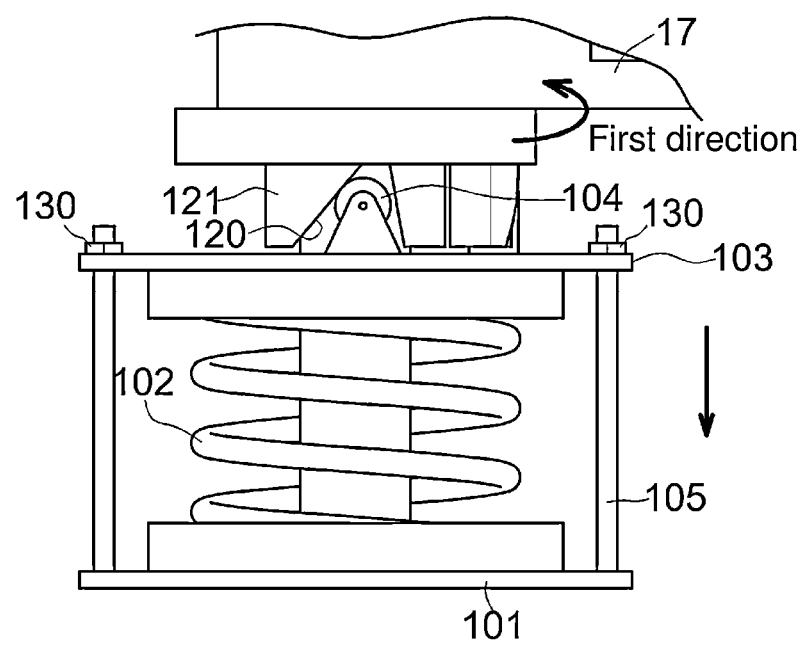
Figure 17:
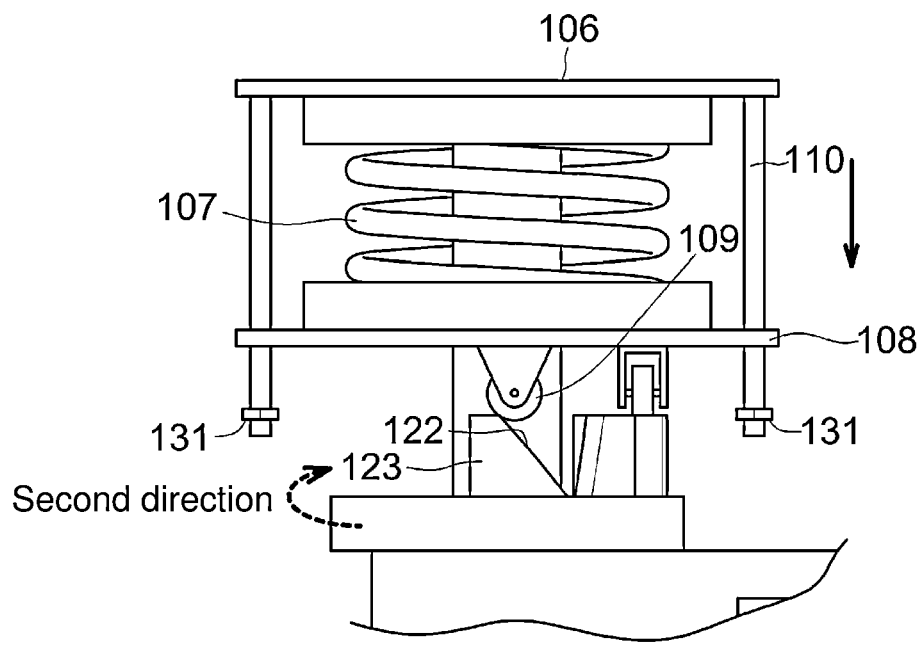
FIGS. 17(A) and 17(B) are side views illustrating biasing means of a modification example.
Figure 17:
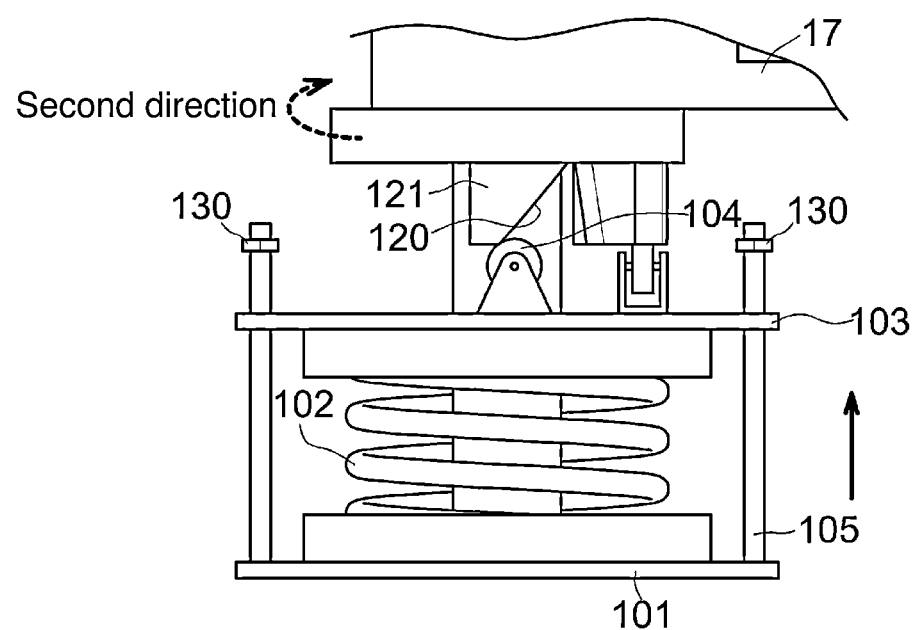

A first protrusion 121 having a first tapered surface 120 is provided on a lower surface of the lower plate 17 (FIGS. 16(B) and 17(B)), and the first tapered surface 120 is inclined in the second direction toward the lower side. A second protrusion 123 having a second tapered surface 122 is provided on the upper surface of the upper plate 16 (FIGS. 16(A) and 17(A)), and the second tapered surface 122 is inclined in the second direction toward the upper side.

According to the above configuration, while the cam arm 9 is being rotated in the first direction, the first tapered surface 120 presses the first roller 104 due to the rotation of the first protrusion 121 in the first direction, so that the first roller 104 rolls from the upper side to the lower side of the first tapered surface 120, a downward force is applied from the first annular plate 103 to the first coil spring 102, and the first coil spring 102 is compressed (from the state in FIG.

16(B) to the state in FIG. 17(B)), and the second tapered surface 122 presses the second roller 109 due to the rotation of the second protrusion 123 in the first direction, so that the second roller 109 rolls from the lower side to the upper side of the second tapered surface 122, an upward force is applied from the second annular plate 108 to the second coil spring 107, and the second coil spring 107 is compressed (from the state in FIG. 16(A) to the state in FIG. 17(A)).

Thereafter, an upward force is applied from the first coil spring 102 to the first annular plate 103 due to the elastic return of the first coil spring 102, and the first roller 104 presses the first tapered surface 120 to bias the cam arm in the second direction. In addition, a downward force is applied from the second coil spring 107 to the second annular plate 108 due to the elastic return of the second coil spring 107, and the second roller 109 presses the second tapered surface 122 to bias the cam arm 9 in the second direction. As a result, the cam arm 9 is reversed from the first direction and rotated in the second direction. Consequently, rolling of the first roller 104 from the lower side to the upper side of the first tapered surface 120 and rolling of the second roller 109 from the upper side to the lower side of the second tapered surface 122 occur (the state in FIG. 17(B) is changed to the state in FIG. 16(B), and the state in FIG. 17(A) is changed to the state in FIG. 16(A)).

The first guide rod 105 guides the vertical movement of the first annular plate 103, and is provided outside the first coil spring 102. The first guide rod 105 extends upward from the base plate 101 and penetrates through the first annular plate 103, and the first bolt 130 is fastened to the upper end of the first guide rod 105 extending from the first annular plate 103. When an upward force is applied from the first coil spring 102 to the first annular plate 103 due to the elastic return of the first coil spring 102, the first annular plate 103 comes into contact with the first bolt 130, so that the first annular plate 103 is stopped (FIG. 16(B) illustrates a state in which the first annular plate 103 comes into contact with the first bolt 130).

The second guide rod 110 guides the vertical movement of the second annular plate 108, and is provided outside the second coil spring 107. The second guide rod 110 extends downward from the top plate 106 and penetrates through the second annular plate 108, and the second bolt 131 is fastened to the lower end portion of the second guide rod 110 extending from the second annular plate 108. When a downward force is applied from the second coil spring 107 to the second annular plate 108 due to the elastic return of the second coil spring 107, the second annular plate 108 comes into contact with the second bolt 131, so that the second annular plate 108 is stopped (FIG. 5(A) illustrates a state in which the first annular plate 103 comes into contact with the first bolt 130).

In a case where the biasing means 100 is provided in the power generation system, the forces of the two coil springs 102 and 107 are applied to the cam arm 9, so that even when the rotational resistance of the rotation body 44 of the generator 4 is large, the rotation body 44 can be rotated through the contact between the large-diameter wheel arm 10 and the large-diameter wheel 42 or the contact between the small-diameter wheel arm 11 and the small-diameter wheel 41, and thus the generator 4 can generate power.

The first guide rod 105 and the second guide rod 110 are not necessarily required and may be omitted.

Even in a case where the biasing means 100 is provided in the power generation system, the large-diameter wheel 42 may be provided above the small-diameter wheel 41, and the large-diameter wheel arm 10 may be provided above the small-diameter wheel arm 11. In this case, the main shaft 12 extends upward from the base plate 101, sequentially passes through the inside of the first coil spring 102 and the inside of the first annular plate 103, then sequentially passes through the lower plate 17, the basal end portion 21a of the first support member 21 (corresponding to the basal end portion of the large-diameter wheel arm 10), the spacer 23 fixed to the main shaft 12, the basal end portion 29a of the second support member 29 (corresponding to the basal end portion of the small-diameter wheel arm 11), and the upper plate 16, then sequentially passes through the inside of the second annular plate 108 and the inside of the second coil spring 107, and reaches the top plate 106.

DESCRIPTION OF REFERENCE NUMERALS

1 Power generation system
2 Cam device
3 Arm mechanism
4 Generator
6 Cam
7 Cam member
8 Main drive shaft
9 Cam arm
10 Large-diameter wheel arm
11 Small-diameter wheel arm
12 Main shaft
13 Biasing means
14 Main shaft penetration member
15 Cam arm body
15a Basal end portion of cam arm body
16 Upper plate
17 Lower plate
18 Coupling plate
19 Space closer to cam device than coupling plate between upper plate and lower plate
20 Space closer to generator than coupling plate between upper plate and lower plate
21 First support member
21a Basal end portion of first support member
22 First movable body
23 Spacer
24 Fixation pin
25 First joint body
26 Second joint body
27 First rod
28 First elastic member
29 Second support member
29a Basal end portion of second support member
30 Second movable body
31 Third joint body
32 Fourth joint body
33 Second rod
34 Second elastic member
35 Base plate
36 Coil spring
37 Annular plate
38 Roller
41 Small-diameter wheel
42 Large-diameter wheel
43 Rotation shaft
44 Rotation body
45 Tapered surface
46 Protrusion
47 First motor shaft
48 First stepping motor
49 Second motor shaft 50 Second stepping motor
51 Third motor shaft
52 Third stepping motor
53 First cam
54 Second cam
55 First stopper
55a First flange portion
56 Second stopper
56a Second flange portion
57 First stopper spring
58 Second stopper spring
59 Rotation sensor
60 Position sensor
61 Control device
62 First through-hole
63 Second through-hole
64 First recess
65 Second recess
72 First movable body
73 First joint body
74 Second joint body
75 First absorber
76 First rod
77 First elastic member
78 First cylinder
79 First spring
80 Third joint body
81 Fourth joint body
82 Second absorber
83 Second rod
84 Second cylinder
84 Second spring
84 Second elastic member
85 Second cylinder
86 Second spring
87 Second movable body
100 Biasing means
101 Base plate
102 First coil spring
103 First annular plate
104 First roller
105 First guide rod
106 Top plate
107 Second coil spring
108 Second annular plate
109 Second roller
120 First tapered surface
121 First protrusion
122 Second tapered surface
123 Second protrusion

The invention claimed is:

1. A power generation system comprising:
a cam device including a cam member of which a cam protrudes from an outer circumferential surface, the cam member being rotated by hydroelectric power or wind power;
a generator including a rotation body in which an arm mechanism that is rotated when the cam comes into contact with the rotation body during rotation of the cam member, a small-diameter wheel, and a large-diameter wheel having an outer diameter larger than that of the small-diameter wheel are attached to a rotation shaft, in which the arm mechanism comes into contact with an outer circumferential surface of either the small-diameter wheel or the large-diameter wheel during rotation of the arm mechanism, and thus the rotation body is rotated, and power is generated by converting rotational energy of the rotation body into electric energy; and
operation control means for transitioning to an operation in a second mode of bringing the arm mechanism into contact with the small-diameter wheel in response to an increase in a rotational speed of the rotation body to a first value while the operation control means is operated in a first mode of bringing the arm mechanism into contact with the large-diameter wheel, and transitioning to an operation in the first mode in response to a decrease in a rotational speed of the rotation body to a second value equal to or smaller than the first value while the operation control means is operated in the second mode,
wherein the arm mechanism includes a cam arm, a large-diameter wheel arm, a small-diameter wheel arm, a main shaft, and biasing means,
the main shaft penetrates through a basal end portion of the cam arm, a basal end portion of the small-diameter wheel arm, and a basal end portion of the large-diameter wheel arm,
the cam arm is rotated about the main shaft in a first direction due to pressing of the cam each time the cam comes into contact with a distal end portion of the cam arm due to rotation of the cam member,
the biasing means biases the cam arm in a second direction opposite to the first direction each time the cam arm is rotated in the first direction, and the cam arm is rotated in the first direction due to the biasing of the biasing means, and is then reversed and rotated in the second direction,
the operation control means,
as an operation in the first mode,
rotates only the large-diameter wheel arm out of the large-diameter wheel arm and the small-diameter wheel arm together with the cam arm in the first direction, then reverses and rotates the large-diameter wheel arm in the second direction, does not bring the large-diameter wheel arm into contact with the large-diameter wheel by retracting the large-diameter wheel arm while the large-diameter wheel arm is being rotated in the first direction, and brings the large-diameter wheel arm into contact with the large-diameter wheel by stretching the large-diameter wheel arm while the large-diameter wheel arm is being rotated in the second direction, and
the operation control means,
as an operation in the second mode,
rotates only the small-diameter wheel arm out of the large-diameter wheel arm and the small-diameter wheel arm together with the cam arm in the first direction, then reverses and rotates the small-diameter wheel arm in the second direction, does not bring the small-diameter wheel arm into contact with the small-diameter wheel by retracting the small-diameter wheel arm while the small-diameter wheel arm is being rotated in the first direction, and brings the small-diameter wheel arm into contact with the small-diameter wheel by stretching the small-diameter wheel arm while the small-diameter wheel arm is being rotated in the second direction.

2. The power generation system according to claim 1, wherein the cam arm includes a main shaft penetration member and a cam arm body, and a basal end portion of the cam arm is configured by the main shaft penetration member, the main shaft penetration member includes an upper plate, a lower plate disposed below the upper plate with a gap therebetween, and a coupling plate extending in a vertical direction and coupling an intermediate portion of the upper plate and an intermediate portion of the lower plate, the cam arm body extends from the coupling plate to a side of the cam device, the basal end portion of the small-diameter wheel arm and the basal end portion of the large-diameter wheel arm are disposed in a space between the upper plate and the lower plate, the space being closer to the generator than the coupling plate is, the biasing means includes a base plate, a coil spring disposed on the base plate, an annular plate supported by an upper end portion of the coil spring, and a roller rotatably attached to an upper surface of the annular plate, and the base plate, the coil spring, the annular plate, and the roller are disposed below the lower plate, the main shaft extends upward from the base plate, sequentially passes through an inside of the coil spring and an inside of the annular plate, and then sequentially passes through the lower plate, the basal end portion of the large-diameter wheel arm, a spacer fixed to the main shaft, the basal end portion of the small-diameter wheel arm, and the upper plate, or sequentially passes through the inside of the coil spring and the inside of the annular plate, and then sequentially passes through the lower plate, the basal end portion of the small-diameter wheel arm, the spacer fixed to the main shaft, the basal end portion of the large-diameter wheel arm, and the upper plate, a protrusion having a tapered surface is provided on a lower surface of the lower plate, and the tapered surface is inclined in the second direction toward a lower side, and while the cam arm is being rotated in the first direction, the tapered surface presses the roller due to rotation of the protrusion in the first direction, so that the roller rolls from an upper side to a lower side of the tapered surface, a downward force is applied from the annular plate to the coil spring, and the coil spring is compressed, then, an upward force is applied from the coil spring to the annular plate due to elastic return of the coil spring, and the roller presses the tapered surface to bias the cam arm in the second direction, so that the cam arm is reversed from the first direction to be rotated in the second direction, and thus, the roller rolls from the lower side to the upper side of the tapered surface.

3. The power generation system according to claim 1, wherein the operation control means includes a first stepping motor having a first motor shaft, a first cam, a second cam, a first stopper, a second stopper, a first stopper spring, a second stopper spring, a rotation sensor, and a control device, the first cam and the second cam are attached to the first motor shaft with a gap therebetween, and the first stepping motor is supported by the upper plate or the lower plate such that the first motor shaft extends in the vertical direction in a space closer to the cam device than the coupling plate between the upper plate and the lower plate, the first cam faces the basal end portion of the large-diameter wheel arm, and the second cam faces the basal end portion of the small-diameter wheel arm, the first stopper passes through a first through-hole of the coupling plate to be movable between the basal end portion of the large-diameter wheel arm and the first cam, the first stopper spring is a coil spring through which the first stopper passes, and is sandwiched between a first flange portion protruding from an outer periphery of the first stopper and the coupling plate, the second stopper passes through a second through-hole of the coupling plate to be movable between the basal end portion of the small-diameter wheel arm and the second cam, the second stopper spring is a coil spring through which the second stopper passes, and is sandwiched between a second flange portion protruding from an outer periphery of the second stopper and the coupling plate, a first recess for fitting one end portion of the first stopper is provided in the basal end portion of the large-diameter wheel arm, a second recess for fitting one end portion of the second stopper is provided in the basal end portion of the small-diameter wheel arm, when the first motor shaft of the first stepping motor is rotated forward, the first cam presses the first stopper toward the large-diameter wheel arm, the first stopper spring is compressed, one end portion of the first stopper is fitted into the first recess, and pressing of the second stopper from the second cam is released, the second stopper spring is elastically returned, and the one end portion of the second stopper is detached from the second recess, when the first motor shaft of the first stepping motor is rotated backward, pressing of the first stopper from the first cam is released, the first stopper spring is elastically returned, one end portion of the first stopper is detached from the first recess, and the second cam presses the second stopper against the small-diameter wheel arm, the second stopper spring is compressed, and the one end portion of the second stopper is fitted into the second recess, the rotation sensor is capable of detecting a rotational speed of the rotation body, in response to a predetermined operation performed on an input unit of the control device, the control device rotates the first motor shaft of the first stepping motor forward, so that the one end portion of the second stopper is detached from the second recess, and the large-diameter wheel arm is rotated together with the cam arm in the first direction, and is then reversed and rotated in the second direction, the control device rotates the first motor shaft of the first stepping motor backward in response to the rotation sensor detecting that the rotational speed of the rotation body has increased to the first value, so that the one end portion of the second stopper is fitted into the second recess, and the small-diameter wheel arm is rotated together with the cam arm in the first direction, and is then reversed and rotated in the second direction, and the control device rotates the first motor shaft of the first stepping motor forward in response to the rotation sensor detecting that the rotational speed of the rotation body has decreased to the second value, so that the one end portion of the second stopper is detached from the second recess, and the large-diameter wheel arm is rotated together with the cam arm in the first direction, and is then reversed and rotated in the second direction.

4. The power generation system according to claim 2, wherein
the large-diameter wheel arm includes a first support member and a first movable body,
a basal end portion of the first support member configures the basal end portion of the large-diameter wheel arm,
the first movable body includes a first joint body, a second joint body, a first rod, and a first elastic member, a distal end portion of the first joint body and a basal end portion of the second joint body are hinge-coupled, a distal end portion of the second joint body and a basal end portion of the first rod are hinge-coupled, the first rod is movably supported by the first support member, and the first elastic member extends from a distal end portion of the first rod and configures the distal end portion of the large-diameter wheel arm,
the small-diameter wheel arm includes a second support member and a second movable body,
a basal end portion of the second support member configures the basal end portion of the small-diameter wheel arm,
the second movable body includes a third joint body, a fourth joint body, a second rod, and a second elastic member, a distal end portion of the third joint body and a basal end portion of the fourth joint body are hinge-coupled, a distal end portion of the fourth joint body and a basal end portion of the second rod are hinge-coupled, the second rod is movably supported by the second support member, and the second elastic member extends from a distal end portion of the second rod and configures the distal end portion of the small-diameter wheel arm,
the operation control means further includes a second stepping motor having a second motor shaft, a third stepping motor having a third motor shaft, and a position sensor,
the second stepping motor is supported by the first support member, and the second motor shaft is connected to a basal end portion of the first joint body,
the third stepping motor is supported by the second support member, and the third motor shaft is connected to a basal end portion of the third joint body,
the position sensor is capable of detecting that the cam arm has reached a rotation start position in the first direction or a rotation start position in the second direction,
a state in which the operation control means stretches the large-diameter wheel arm while the large-diameter wheel arm is being rotated in the second direction is realized by the control device rotating the second motor shaft of the second stepping motor forward in response to the position sensor detecting that the cam arm has reached the rotation start position in the second direction, so that the first joint body and the second joint body become linear and the first rod and the first elastic member are moved toward the generator due to pressing of the second joint body, and the first elastic member comes into contact with the large-diameter wheel while the large-diameter wheel arm is being rotated in the second direction,
a state in which the operation control means retracts the large-diameter wheel arm while the large-diameter wheel arm is being rotated in the first direction is realized by the control device rotating the second motor shaft of the second stepping motor backward in response to the position sensor detecting that the cam arm has reached the rotation start position in the first direction, so that the first joint body and the second joint body are bent and the first rod and the first elastic member are moved toward the cam member due to traction of the second joint body, and the first elastic member does not come into contact with the large-diameter wheel while the large-diameter wheel arm is being rotated in the first direction,
a state in which the operation control means stretches the small-diameter wheel arm while the small-diameter wheel arm is being rotated in the second direction is realized by control device rotating the third motor shaft of the third stepping motor forward in response to the position sensor detecting that the cam arm has reached the rotation start position in the second direction, so that the third joint body and the fourth joint body become linear and the second rod and the second elastic member are moved toward the generator due to pressing of the fourth joint body, and the second elastic member comes into contact with the small-diameter wheel while the small-diameter wheel arm is being rotated in the second direction, and
a state in which the operation control means retracts the small-diameter wheel arm while the small-diameter wheel arm is being rotated in the first direction is realized by the control device rotating the third motor shaft of the third stepping motor backward in response to the position sensor detecting that the cam arm has reached the rotation start position in the first direction, so that the third joint body and the fourth joint body are bent and the second rod and the second elastic member are moved toward the cam member due to traction of the fourth joint body, and the second elastic member does not come into contact with the small-diameter wheel while the small-diameter wheel arm is being rotated in the first direction.

5. The power generation system according to claim 2, wherein
the large-diameter wheel arm includes a first support member and a first movable body,
a basal end portion of the first support member configures the basal end portion of the large-diameter wheel arm,
the first movable body includes a first joint body, a second joint body, a first absorber, a first rod, and a first elastic member, and the first rod is movably supported by the first support member,
the first absorber includes a first cylinder having an opening at a distal end thereof, and a first spring disposed inside the first cylinder, a distal end portion of the first joint body and a basal end portion of the second joint body are hinge-coupled, a distal end portion of the second joint body and a basal end portion of the first cylinder are hinge-coupled, a basal end portion of the first spring and a basal end portion of the first cylinder are connected, a distal end portion of the first spring and a basal end portion of the first rod are connected, and the first elastic member extends from the distal end portion of the first rod and configures the distal end portion of the large-diameter wheel arm,
the small-diameter wheel arm includes a second support member and a second movable body,
a basal end portion of the second support member configures the basal end portion of the small-diameter wheel arm,
the second movable body includes a third joint body, a fourth joint body, a second absorber, a second rod, and a second elastic member, and the second rod is movably supported by the second support member, the second absorber includes a second cylinder having an opening at a distal end thereof, and a second spring disposed inside the second cylinder, a distal end portion of the third joint body and a basal end portion of the fourth joint body are hinge-coupled, a distal end portion of the fourth joint body and a basal end portion of the second cylinder are hinge-coupled, a distal end portion of the second spring and a basal end portion of the second rod are connected, and the second elastic member extends from a distal end portion of the second rod and configures the distal end portion of the small-diameter wheel arm, the operation control means further includes a second stepping motor having a second motor shaft, a third stepping motor having a third motor shaft, and a position sensor, the second stepping motor is supported by the first support member, and the second motor shaft is connected to a basal end portion of the first joint body, the third stepping motor is supported by the second support member, and the third motor shaft is connected to a basal end portion of the third joint body, the position sensor is capable of detecting that the cam arm has reached the rotation start position in the first direction or the rotation start position in the second direction, a state in which the operation control means stretches the large-diameter wheel arm while the large-diameter wheel arm is being rotated in the second direction is realized by the control device rotating the second motor shaft of the second stepping motor forward in response to the position sensor detecting that the cam arm has reached the rotation start position in the second direction, so that the first joint body and the second joint body become linear and the first cylinder, the first spring, the first rod, and the first elastic member are moved toward the generator, and the first elastic member comes into contact with the large-diameter wheel while the large-diameter wheel arm is being rotated in the second direction, a state in which the operation control means retracts the large-diameter wheel arm while the large-diameter wheel arm is being rotated in the first direction is realized by the control device rotating the second motor shaft of the second stepping motor backward in response to the position sensor detecting that the cam arm has reached the rotation start position in the first direction, so that the first joint body and the second joint body are bent and the first cylinder, the first spring, the first rod, and the first elastic member are moved toward the cam wheel, and the first elastic member does not come into contact with the large-diameter wheel while the large-diameter wheel arm is being rotated in the first direction, a state in which the operation control means stretches the small-diameter wheel arm while the small-diameter wheel arm is being rotated in the second direction is realized by the control device rotating the third motor shaft of the third stepping motor forward in response to the position sensor detecting that the cam arm has reached the rotation start position in the second direction, so that the third joint body and the fourth joint body become linear and the second cylinder, the second spring, the second rod, and the second elastic member are moved toward the generator, and the second elastic member comes into contact with the small-diameter wheel while the small-diameter wheel arm is being rotated in the second direction, and a state in which the operation control means retracts the small-diameter wheel arm while the small-diameter wheel arm is being rotated in the first direction is realized by the control device rotating the third motor shaft of the third stepping motor backward in response to the position sensor detecting that the cam arm has reached the rotation start position in the first direction, so that the third joint body and the fourth joint body are bent and the second cylinder, the second spring, the second rod, and the second elastic member are moved toward the cam member, and the second elastic member does not come into contact with the small-diameter wheel while the small-diameter wheel arm is being rotated in the first direction.

6. The power generation system according to claim 3, wherein the large-diameter wheel arm includes a first support member and a first movable body, a basal end portion of the first support member configures the basal end portion of the large-diameter wheel arm, the first movable body includes a first joint body, a second joint body, a first rod, and a first elastic member, a distal end portion of the first joint body and a basal end portion of the second joint body are hinge-coupled, a distal end portion of the second joint body and a basal end portion of the first rod are hinge-coupled, the first rod is movably supported by the first support member, and the first elastic member extends from a distal end portion of the first rod and configures the distal end portion of the large-diameter wheel arm, the small-diameter wheel arm includes a second support member and a second movable body, a basal end portion of the second support member configures the basal end portion of the small-diameter wheel arm, the second movable body includes a third joint body, a fourth joint body, a second rod, and a second elastic member, a distal end portion of the third joint body and a basal end portion of the fourth joint body are hinge-coupled, a distal end portion of the fourth joint body and a basal end portion of the second rod are hinge-coupled, the second rod is movably supported by the second support member, and the second elastic member extends from a distal end portion of the second rod and configures the distal end portion of the small-diameter wheel arm, the operation control means further includes a second stepping motor having a second motor shaft, a third stepping motor having a third motor shaft, and a position sensor, the second stepping motor is supported by the first support member, and the second motor shaft is connected to a basal end portion of the first joint body, the third stepping motor is supported by the second support member, and the third motor shaft is connected to a basal end portion of the third joint body, the position sensor is capable of detecting that the cam arm has reached a rotation start position in the first direction or a rotation start position in the second direction, a state in which the operation control means stretches the large-diameter wheel arm while the large-diameter wheel arm is being rotated in the second direction is realized by the control device rotating the second motor shaft of the second stepping motor forward in response to the position sensor detecting that the cam arm has reached the rotation start position in the second direction, so that the first joint body and the second joint body become linear and the first rod and the first elastic member are moved toward the generator due to pressing of the second joint body, and the first elastic member comes into contact with the large-diameter wheel while the large-diameter wheel arm is being rotated in the second direction, a state in which the operation control means retracts the large-diameter wheel arm while the large-diameter wheel arm is being rotated in the first direction is realized by the control device rotating the second motor shaft of the second stepping motor backward in response to the position sensor detecting that the cam arm has reached the rotation start position in the first direction, so that the first joint body and the second joint body are bent and the first rod and the first elastic member are moved toward the cam member due to traction of the second joint body, and the first elastic member does not come into contact with the large-diameter wheel while the large-diameter wheel arm is being rotated in the first direction, a state in which the operation control means stretches the small-diameter wheel arm while the small-diameter wheel arm is being rotated in the second direction is realized by control device rotating the third motor shaft of the third stepping motor forward in response to the position sensor detecting that the cam arm has reached the rotation start position in the second direction, so that the third joint body and the fourth joint body become linear and the second rod and the second elastic member are moved toward the generator due to pressing of the fourth joint body, and the second elastic member comes into contact with the small-diameter wheel while the small-diameter wheel arm is being rotated in the second direction, and a state in which the operation control means retracts the small-diameter wheel arm while the small-diameter wheel arm is being rotated in the first direction is realized by the control device rotating the third motor shaft of the third stepping motor backward in response to the position sensor detecting that the cam arm has reached the rotation start position in the first direction, so that the third joint body and the fourth joint body are bent and the second rod and the second elastic member are moved toward the cam member due to traction of the fourth joint body, and the second elastic member does not come into contact with the small-diameter wheel while the small-diameter wheel arm is being rotated in the first direction.

7. The power generation system according to claim 3, wherein the large-diameter wheel arm includes a first support member and a first movable body, a basal end portion of the first support member configures the basal end portion of the large-diameter wheel arm, the first movable body includes a first joint body, a second joint body, a first absorber, a first rod, and a first elastic member, and the first rod is movably supported by the first support member, the first absorber includes a first cylinder having an opening at a distal end thereof, and a first spring disposed inside the first cylinder, a distal end portion of the first joint body and a basal end portion of the second joint body are hinge-coupled, a distal end portion of the second joint body and a basal end portion of the first cylinder are hinge-coupled, a basal end portion of the first spring and a basal end portion of the first cylinder are connected, a distal end portion of the first spring and a basal end portion of the first rod are connected, and the first elastic member extends from the distal end portion of the first rod and configures the distal end portion of the large-diameter wheel arm, the small-diameter wheel arm includes a second support member and a second movable body, a basal end portion of the second support member configures the basal end portion of the small-diameter wheel arm, the second movable body includes a third joint body, a fourth joint body, a second absorber, a second rod, and a second elastic member, and the second rod is movably supported by the second support member, the second absorber includes a second cylinder having an opening at a distal end thereof, and a second spring disposed inside the second cylinder, a distal end portion of the third joint body and a basal end portion of the fourth joint body are hinge-coupled, a distal end portion of the fourth joint body and a basal end portion of the second cylinder are hinge-coupled, a distal end portion of the second spring and a basal end portion of the second rod are connected, and the second elastic member extends from a distal end portion of the second rod and configures the distal end portion of the small-diameter wheel arm, the operation control means further includes a second stepping motor having a second motor shaft, a third stepping motor having a third motor shaft, and a position sensor, the second stepping motor is supported by the first support member, and the second motor shaft is connected to a basal end portion of the first joint body, the third stepping motor is supported by the second support member, and the third motor shaft is connected to a basal end portion of the third joint body, the position sensor is capable of detecting that the cam arm has reached the rotation start position in the first direction or the rotation start position in the second direction, a state in which the operation control means stretches the large-diameter wheel arm while the large-diameter wheel arm is being rotated in the second direction is realized by the control device rotating the second motor shaft of the second stepping motor forward in response to the position sensor detecting that the cam arm has reached the rotation start position in the second direction, so that the first joint body and the second joint body become linear and the first cylinder, the first spring, the first rod, and the first elastic member are moved toward the generator, and the first elastic member comes into contact with the large-diameter wheel while the large-diameter wheel arm is being rotated in the second direction, a state in which the operation control means retracts the large-diameter wheel arm while the large-diameter wheel arm is being rotated in the first direction is realized by the control device rotating the second motor shaft of the second stepping motor backward in response to the position sensor detecting that the cam arm has reached the rotation start position in the first direction, so that the first joint body and the second joint body are bent and the first cylinder, the first spring, the first rod, and the first elastic member are moved toward the cam wheel, and the first elastic member does not come into contact with the large-diameter wheel while the large-diameter wheel arm is being rotated in the first direction, a state in which the operation control means stretches the small-diameter wheel arm while the small-diameter wheel arm is being rotated in the second direction is realized by the control device rotating the third motor shaft of the third stepping motor forward in response to the position sensor detecting that the cam arm has reached the rotation start position in the second direction, so that the third joint body and the fourth joint body become linear and the second cylinder, the second spring, the second rod, and the second elastic member are moved toward the generator, and the second elastic member comes into contact with the small-diameter wheel while the small-diameter wheel arm is being rotated in the second direction, and a state in which the operation control means retracts the small-diameter wheel arm while the small-diameter wheel arm is being rotated in the first direction is realized by the control device rotating the third motor shaft of the third stepping motor backward in response to the position sensor detecting that the cam arm has reached the rotation start position in the first direction, so that the third joint body and the fourth joint body are bent and the second cylinder, the second spring, the second rod, and the second elastic member are moved toward the cam member, and the second elastic member does not come into contact with the small-diameter wheel while the small-diameter wheel arm is being rotated in the first direction.

* * * * *